(12) United States Patent
Waite et al.

(10) Patent No.: US 7,062,414 B2
(45) Date of Patent: Jun. 13, 2006

(54) METHOD AND APPARATUS FOR DIGITAL DETECTION OF ELECTROMAGNETIC SIGNAL STRENGTH AND SIGNAL DIRECTION IN METALLIC PIPES AND CABLES

(75) Inventors: James W. Waite, Los Gatos, CA (US); Johan D. Overby, Sunnyvale, CA (US)

(73) Assignee: Metrotech Corporation, Santa Clara, CA (US)

( * ) Notice: Subject to any disclaimer, the term of this patent is extended or adjusted under 35 U.S.C. 154(b) by 101 days.

(21) Appl. No.: 10/622,376

(22) Filed: Jul. 18, 2003

(65) Prior Publication Data

US 2005/0096879 A1    May 5, 2005

(51) Int. Cl.
    *G01V 3/08*    (2006.01)
(52) U.S. Cl. ............... 702/189; 324/326; 324/327; 324/328; 324/329
(58) Field of Classification Search ........... 702/189; 324/66, 67, 232, 233, 326–329, 335, 73.1; 455/103, 107, 108, 110, 113, 115.1, 115.3, 455/118, 121; 379/25
See application file for complete search history.

(56) References Cited

U.S. PATENT DOCUMENTS

| 4,723,216 | A | * | 2/1988 | Premerlani .................. 702/126 |
| 4,802,009 | A | * | 1/1989 | Hartmeier ................... 348/537 |
| 4,942,360 | A | * | 7/1990 | Candy ........................ 324/329 |
| 5,025,227 | A | * | 6/1991 | Walton ........................ 331/65 |
| 5,231,355 | A | * | 7/1993 | Rider et al. .................. 324/326 |
| 5,260,659 | A | * | 11/1993 | Flowerdew et al. ......... 324/326 |
| 5,541,516 | A | * | 7/1996 | Rider et al. .................. 324/326 |
| 6,140,819 | A | * | 10/2000 | Peterman et al. ........... 324/326 |
| 6,310,579 | B1 | * | 10/2001 | Meredith ..................... 343/703 |

(Continued)

FOREIGN PATENT DOCUMENTS

EP    299724 A2 *    1/1989

(Continued)

OTHER PUBLICATIONS

Doolittle, James A. et al., "A comparison of EM induction and GPR methods in areas of karst," Elsevier B.V. (1998), 85:83-102.

(Continued)

*Primary Examiner*—Carol S. W. Tsai
(74) *Attorney, Agent, or Firm*—Finnegan, Henderson, Farabow, Garrett & Dunner, L.L.P.

(57) ABSTRACT

A new digital architecture for metallic pipe and cable locators, providing accurate estimation of the fundamental locate parameters, electromagnetic signal strength and signal direction, and utilizing a nested Digital Phase-Locked Loop (DPLL) structure is disclosed. The obstacles to signal direction measurement in low SINR environments using the signal select method are overcome and a more precise phase comparison between the carrier and the FM modulation signals is obtained. The architecture further significantly reduces analog front-end hardware requirements, offers wider resistance to component tolerances, lower calibration and test time, and provides flexible frequency selectivity. Locators according to the present invention provide accurate estimation of the fundamental physical parameters of line location (electromagnetic signal strength and signal direction) in extremely noisy environments, using Digital Signal Processing (DSP) methods.

49 Claims, 11 Drawing Sheets

U.S. PATENT DOCUMENTS

| | | | |
|---|---|---|---|
| 6,396,433 B1 | 5/2002 | Clodfelter | |
| 6,424,820 B1* | 7/2002 | Burdick et al. | 455/41.1 |
| 6,529,006 B1 | 3/2003 | Hayes | |
| 6,735,263 B1* | 5/2004 | Moriya et al. | 375/326 |
| 6,751,553 B1 | 6/2004 | Young et al. | |
| 2002/0196177 A1 | 12/2002 | Johansson et al. | |
| 2004/0070399 A1* | 4/2004 | Olsson et al. | 324/326 |
| 2005/0088301 A1* | 4/2005 | Abbruscato | 340/539.32 |
| 2005/0156776 A1 | 7/2005 | Waite | |

FOREIGN PATENT DOCUMENTS

EP    0 780 704 B    6/2001

OTHER PUBLICATIONS

Office Action dated Oct. 27, 2005, received in U.S. Appl. No. 10/997,729.

As-filed U.S. Appl. No. 11/193,1000, filed Jul. 29, 2005.

* cited by examiner

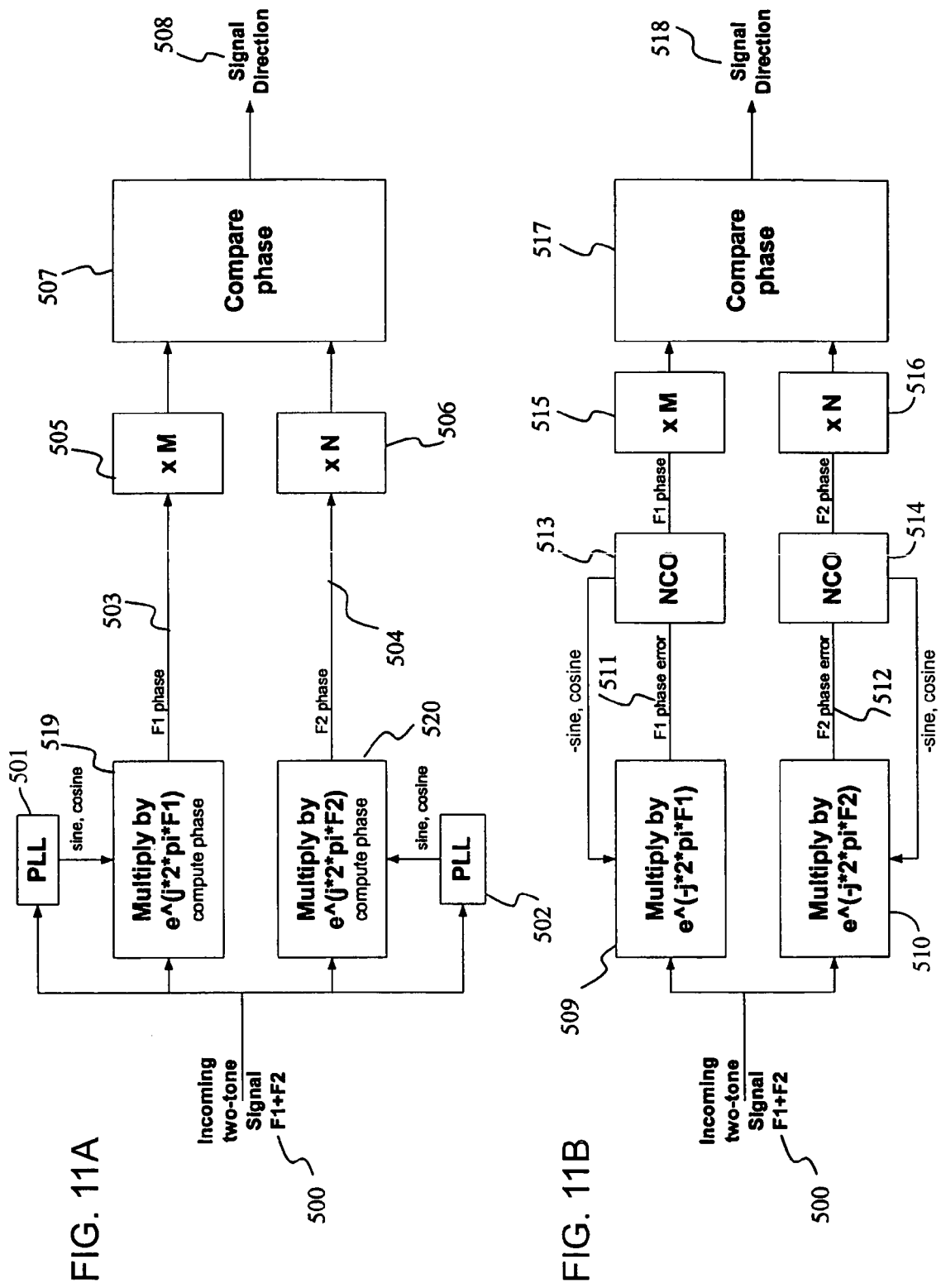

METHOD AND APPARATUS FOR DIGITAL DETECTION OF ELECTROMAGNETIC SIGNAL STRENGTH AND SIGNAL DIRECTION IN METALLIC PIPES AND CABLES

BACKGROUND

1. Field of the Invention

Embodiments of the present invention relate to detection of electromagnetic signals from hidden conductors and, in particular, to the digital detection of electromagnetic signal strength and signal direction in buried or hidden metallic pipes and cables.

2. Discussion of Related Art

Underground pipe and cable locators (sometimes termed line locators) have existed for many years and are described in many issued patents and other publications. Line locator systems typically include a mobile receiver and a transmitter. The transmitter is coupled to a target conductor, either by direct electrical connection or through induction, to provide a signal on the target conductor. The receiver detects and processes a signal, which can be a continuous wave sinusoidal signal, transmitted from the target conductor as a result of the signal provided to the target conductor by the transmitter.

The transmitter is physically separate from the receiver, often with a separation distance of several meters to several kilometers. The transmitter couples the signal, which can be user-chosen from a selectable set of frequencies, to the target conductor. The frequency of the signal applied to the target conductor can be referred to as the active locate frequency. The target conductor then generates an electromagnetic field in response to the signal.

Different location methodologies and underground environments call for different active frequencies. The typical range of active locate frequencies can be from several Hertz (for location of the underground conductor over separation distances between the transmitter and receiver of many kilometers of cable) to 100 kHz or more. Significant radio frequency interference on the signal received by the receiver can be present in the environment over this range. Therefore, the receivers of line location systems have generally included a set of highly tuned analog filters to preclude interference from outside sources from affecting the measurement of signals at the desired active locate frequency from the target conductor. These filters are tuned to receive signals at each of the selectable active locate frequencies.

Some existing systems include a microprocessor or digital signal processor (DSP) to determine the amplitude of the signal from the target conductor detected at the receiver. For detection of signals generated by the target conductor that are at higher frequency, analog heterodyne methods have been employed in receivers to down-convert segments of the RF spectrum to a lower bandwidth, allowing the digital signal processing to run at lower sample rates while detecting the key physical parameters of the signal used for line location.

Existing receivers for line location systems include analog front-end designs that are tuned to detect signals at the active locate frequency (or frequencies). When more than one active frequency is available in the line locator system, additional analog signal processing elements are often present in the receiver to process signals of each of the available active frequencies. Precise internal calibrations, which are sensitive to drift and other performance degradations over time, are required to process signals at each of the available active frequencies. The calibration process itself is often problematic due to interference and noise sources, including those present in the environment and the receiver itself.

In line location systems, the signal strength parameter (related to the amplitude of the received signal) is the basis for derived quantities of line current, position relative to the center of the conductor, depth of the conductor, and is used as the input to a peak or null indicator (depending on the orientation of the coil antenna). All line location systems measure signal strength on one or more measurement channels. Examples of line locators are included in the following U.S. patents: U.S. Pat. No. 6,130,539, "Automatic Gain Control for a Line Locator," Stevan Polak, assigned to the same assignee as is the present invention, herein incorporated by reference in its entirety; and U.S. Pat. No. 6,407, 550, "Line Locator with Accurate Horizontal Displacement Detection," Gopalakrishnan Parakulum and Stevan Polak, assigned to the same assignee as is the present invention, herein incorporated by reference in its entirety.

Often in a crowded underground utility environment of metallic pipes and cables, coupling of signals at the active locating frequency from the target conductor to other adjacent underground conductors can occur. These conductors (lines) are not intended to be tracked by the line location system, but coupling through various means (capacitive, conductive, or inductive) can lead a line locator astray such that the operator of the line location system ceases tracking the pipe or cable of interest and instead begins following an adjacent, nearly parallel line. A measurement of a signal direction parameter can effectively mitigate the effects of coupling and thereby allow the operator to detect situations where signals from an adjacent conductor are being detected and monitored in the receiver rather than signals from the target conductor.

When coupling occurs between adjacent lines, the induced voltage signal in the adjacent line is reversed from the signal present in the target conductor. This is because the current that has propagated to the adjacent line is seeking an easier return path to a ground stake at the transmitter of the line locating system. By convention, the outgoing signal from the transmitter is taken as the positive direction, and the incoming as the negative. By monitoring the signal direction in addition to signal strength, one can detect a likely coupling situation through a positive-to-negative direction change. Thus, an operator using a line locating device equipped with a signal direction measurement capability has an advantage over one who does not.

Even with this potential benefit, signal direction is not commonly present on line locating systems because the reliable determination of the signal direction is difficult. At least two methods are presently utilized to detect signal direction. Both methods require the collaboration of the transmitter to allow a phase reference to be derived at the receiver. With a common phase reference between transmitter and receiver, the signal direction can be deduced.

The first method, commonly called current direction, as described in U.S. Pat. No. 5,260,659 with additional development noted in U.S. Pat. No. 6,549,011, requires the transmission of harmonically related sinusoids (or as in the case of U.S. Pat. No. 6,549,011 sinusoids related by $N*F1=M*F2$, with N and M chosen from a special set of integers), and a compatible receiver with a convention that the signal direction is positive when the phases of each component sinusoid are as transmitted. For negative signal direction (indicating an incoming signal at the transmitter), the relative phase of the two component sinusoids switches to 180° for the same phase reference point at the receiver.

A similar approach to estimating the signal direction is described in U.S. Pat. No. 5,438,266. Two distinct and harmonically related frequencies are evaluated at the receiver to detect the reversal of the phase relationship between the two frequencies, and hence the change in signal direction.

The approaches detailed in the above methods of estimating signal direction rely on the fact that radio frequency (RF) wavelengths at these frequencies are long, and one can traverse a section of cable or pipe and be reasonably certain that a change in sign of the phase reference from positive to negative will be a result of the locating system picking up signals coupled to a parallel conductor instead of the target conductor. Unfortunately, there are several drawbacks to these approaches. The first problem is that the user must pause periodically and reset the phase reference to a new position, before enough distance has been traversed that the phase reference changes sign on the primary targeted conductor.

A second problem has to do with variability in the physical transmission medium of the cable or pipe, particularly at higher locate frequencies which are more susceptible to capacitive coupling. All such media are acknowledged in the communications literature as being characterized as a "channel," with a measurable magnitude and phase characteristic as a function of frequency. Unfortunately, one cannot know this characteristic a priori, so the phase of the signal can change in unknown ways as the receiver is moved along the line. Because the two component signals can be separated from each other in frequency by a non-negligible factor, their relative phase responses can vary with position on the line. This compromises the ability to determine the phase reference point.

A third drawback to approaches that rely on the simultaneous transmission of disjoint frequencies is that the receiver hardware system becomes more complex in order to accurately process both component signals. For example, accurate discrimination of both frequencies requires doubling up the tunable analog filters.

The second method (referred to as signal select) is described in U.S. Pat. No. 6,411,073 and is attractive because no arbitrary phase reference needs to be set by the user at the receiving location. Instead, the transmitter and receiver collaborate by defining a phase reference in the transmitted signal via frequency modulation (FM). Modulating a small variation in frequency around a carrier adds one degree of freedom to the transmitted signal that can be unambiguously discriminated by the receiver independent of whether the signal direction is outgoing or incoming. This allows the adoption of a convention between transmitter and receiver that the phase of the carrier when the FM modulation is at the highest frequency defines the phase reference point, for the purpose of determining signal direction. For the primary targeted conductor, the receiver detects the same sense of the carrier at the high frequency deflection of the FM signal. However, for a parallel conductor that is carrying the signal in the reverse direction, the carrier sense is reversed at the peak frequency of the FM modulation.

Thus for the signal select method, the receiver can compare the carrier phase once per period at the FM modulation rate. This results in a frequent measure of signal direction that does not require the user to reset a reference phase, surmounting a flaw of the previous current direction measuring methods. Furthermore, since the FM modulation extends over only a small frequency range around the carrier (typically +/−1%) the phase response variation due to channel effects is small.

The elegance of this approach is offset by the difficulty of comparing signal phases as described in U.S. Pat. No. 6,411,073. As suggested, the FM modulation frequency is up to 100 times less than the carrier frequency. Thus the receiver must demodulate the FM signal, and compare to the carrier such that the phase error in FM demodulation can be no larger than ½ of the carrier signal period. This is equivalent to requiring an FM demodulation phase accuracy of 360/100/2=1.8°. An error larger than this will result in a false detection of signal direction. In environments subject to high interference, the FM demodulation accuracy is subject to increased error that can appear as phase jitter in the demodulated signal, reducing the reliability of the signal direction indication.

If the modulation frequency were increased, a less restrictive phase accuracy would be required for accurate signal direction estimation. However, this has a negative side effect of requiring an increased bandwidth at the receiver. Typically, line location systems reduce interference by implementing very narrowband filters around the carrier frequency, eliminating as much as possible signals picked up from the antennas that do not represent the active locating frequency. For the signal select method, the single sinusoidal carrier frequency has been extended to an FM modulated signal, and so the bandwidth of the locating system must necessarily increase to at least twice the modulation rate around the carrier. Thus the receiver, and the signal strength and signal direction estimators in the receiver, are open to more broadband noise and in-band interference than the normal (single carrier, non-FM modulated) case.

Therefore, there is a need for line location systems capable of accurately determining the signal strength parameter and the signal direction parameter from detected signals originating from a target conductor, especially at low signal levels in the presence of interference.

SUMMARY OF THE INVENTION

In accordance with the invention, a digital line locator receiver architecture with significantly reduced analog front-end hardware requirements, wide resistance to component tolerances, lower calibration and test time, and flexible frequency selectivity is presented. Line locators according to some embodiments of the present invention provide accurate estimation of the fundamental physical parameters of line location (electromagnetic signal strength and signal direction) in extremely noisy environments.

Locator receivers according to the present invention include a first digital phase locked loop that locks to a first frequency and a second digital phase locked loop that locks to a second frequency. The first digital phase-locked loop and the second digital phase-locked loop each include a numerically controlled oscillator to update loop equations. In some embodiments, the first digital phase-locked loop and the second digital phase-locked loop may be coupled in parallel to receive an input signal. In some embodiments, the second digital phase-locked loop may be nested with the first digital phase-locked loop.

Some embodiments of a locator receiver according to the present invention include at least one processing channel including an electromagnetic field detector, an analog processor coupled to receive signals from the electromagnetic field detector, and a digital processor coupled to receive signals from the analog processor and calculate a signal strength parameter and a modulated signal; and a display device coupled to receive and display parameters based on the signal strength parameter and the signal direction parameter, wherein the analog processor includes a fixed bandwidth anti-aliasing filter, and wherein the digital processor includes an analog-to-digital converter, a digital phase-locked loop coupled to receive the output signal from the analog-to-digital converter and provide the signal strength parameter, and a nested digital phase-locked loop coupled to the phase-locked loop to provide the modulated signal. In some embodiments, the modulated signal may be utilized to obtain a signal direction parameter. In some embodiments, the locator receiver may receive electromagnetic radiation generated by a sonde or a marker instead of an elongated conductor.

The signal strength parameter from each of the at least one processing channel can be utilized to compute various characteristics of the conductor, such as current, depth and location. The analog-to-digital converter can sample at twice the highest selectable location frequency or may undersample by sampling at less than twice the highest selectable location frequency.

The digital phase-locked loop may be a second order phase-locked loop where the in-phase value is the signal strength parameter. The nested digital phase-locked loop may be a first order phase-locked loop operating from a frequency value determined by the phase-locked loop where the modulated signal is the phase value determined from an FM demodulated signal. In some embodiments, a time instant of the active locate carrier signal (the carrier index), from which a signal direction parameter can be determined, is interpolated from the zero crossing of the phase value of the nested phase-locked loop.

Line locators implemented according to embodiments of the present invention can provide a reliable signal direction measurement at all times when the field strength (which is related to the amplitude of the signal generated by a detector in response to the electromagnetic field) is displayed. This ability directly leads to increased confidence that the indications of line current, depth, centerline position, and field strength provided by the line location system refer to the primary tracked cable or pipe; rather than an adjacent line that is carrying an electromagnetically induced ground return current.

These and other embodiments are further discussed below with reference to the following figures.

BRIEF DESCRIPTION OF THE DRAWINGS

FIG. 11A shows a conventional system for determining a signal direction from an input signal.

FIG. 11B shows an embodiment of the present invention for determining a signal direction from an input signal.

In the figures, elements having the same designation have the same or similar functions. Elements in the figures are not drawn to scale.

DESCRIPTION OF THE EMBODIMENTS

Figure 8:
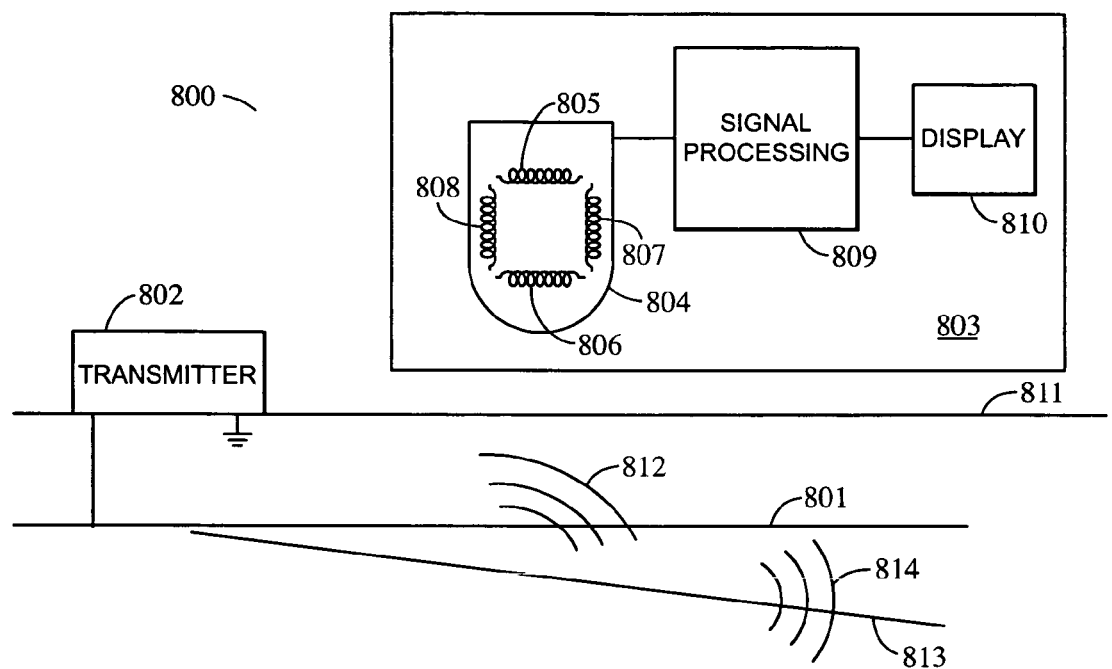
FIG. 8 illustrates an embodiment of a line locator system according to the present invention.

FIG. 8 illustrates a conductor locator system 800 according to some embodiments of the present invention. As shown in FIG. 8, line locator system 800 includes a transmitter 802 and a receiver 803 (not drawn to scale). Transmitter 802 is electrically coupled,—directly, capacitively, or through induction—to a target conductor 801. Target conductor 801 can be a pipe, wire, or other elongated conductor. Conductor 801 is hidden by a surface 811. Surface 811 can be the ground, in which case conductor locator system 800 is a line locator system. In some embodiments, surface 810 can be a wall or other surface.

In some embodiments, transmitter 802 can provide a signal to conductor 801 at one of a set of user-selectable carrier frequencies. In some embodiments, the user-selectable frequencies range from a few kHz to a few MHz. Additionally, the signal may be frequency modulated (FM modulated). In response to the signal supplied by transmitter 802, conductor 801 generates an electromagnetic field 812 that can be detected by receiver 803. Electromagnetic field 812 reflects both the frequency and amplitude of the signal coupled to conductor 801 from transmitter 802.

Receiver 803 has one or more detectors to detect electromagnetic field 812. In the embodiment shown in FIG. 8, detectors 804 include detectors 805, 806, 807, and 808, which can be coil detectors arranged to measure vertical or horizontal components of the magnetic field of electromagnetic field 812. Detectors 807 and 808 are arranged to measure the vertical component of the magnetic field and are situated in parallel to allow determination of the horizontal location of the position of conductor 801 under surface 810 based on the electromagnetic field strengths measured by detectors 807 and 808. Detectors 805 and 806 are arranged to measure the horizontal component of the magnetic field of electromagnetic field 812 and are situated to allow for a calculation of the depth of conductor 801 under surface 811 based on the electromagnetic field strengths measured by detectors 807 and 808. Both line location and depth can be determined based on the signal strengths measured by detectors 805, 806, 807 and 808.

In general, there can be any number of detectors. Signals from each of detectors 805, 806, 807, and 808 are input to signal processor 809. Signal processor 809 is coupled to display 810 to present the results of the signal processing performed in signal processor 809. In some embodiments, each of detectors 805, 806, 807 and 808 are included in separate signal processing channels in signal processor 809 so that signals from each of the detectors in detectors 804 are independently processed. Each signal processing channel in signal processor 809 includes an analog and a digital portion.

Figure 9:
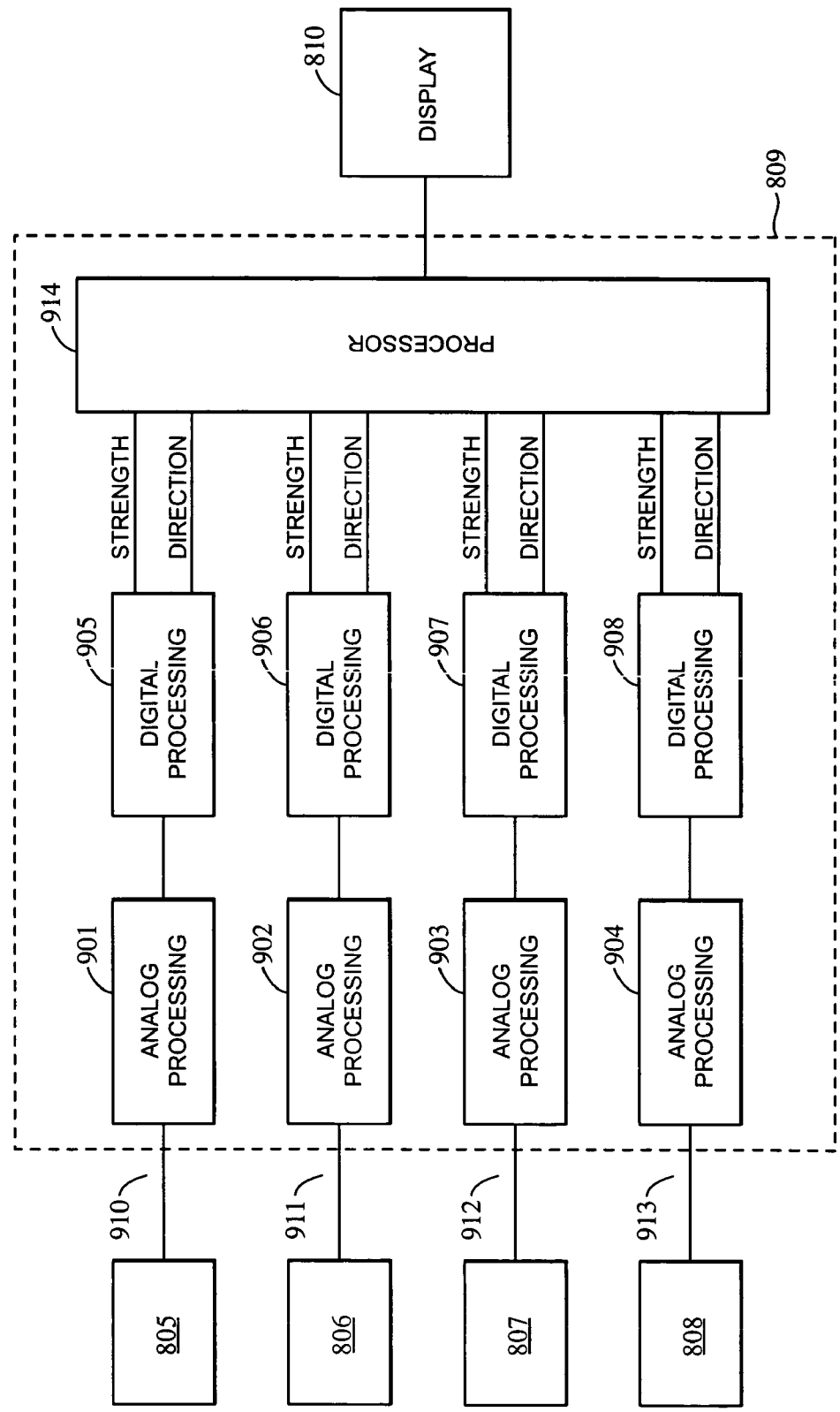
FIG. 9 illustrates an embodiment of signal processing in a line locator according to the present invention.

FIG. 9 shows a block diagram of the signal processing in receiver 803. As shown in the four-detector embodiment illustrated in FIGS. 8 and 9, four signal processing channels are formed. Channel 910 includes detector 805; channel 911 includes detector 806; channel 912 includes detector 807 and channel 913 includes detector 808. Signal processor 809, then, includes processing for each of the signals in channels 910, 911, 912 and 913. The output signal from detector 805, which provides an output signal in response to horizontal components of the magnetic field of electromagnetic field 812, is received in channel 910 into analog processor 901. Analog processor 901 can provide some filtering and amplification before the signal is received into digital processor 905. Digital processor 905 provides digital filtering and determines, based on the characteristics of the signal provided by detector 805, the strength of the signal detected by detector 805 and a signal direction. Similarly, in channel 911 the output signal from detector 806 is processed by analog processor 902 and digital processor 906; in channel 912, the output signal from detector 807 is processed by analog processor 903 and digital processor 907; and the output signal from detector 808 is processed by analog processor 904 and digital processor 908.

The signal strength and the signal direction determined in each of channels 910, 911, 912 and 913 can be input to processor 914. Processor 914, based on the data from each of channels 910, 911, 912 and 913, can then determine parameters such as depth and location of conductor 801 as well as whether receiver 803 remains positioned to locate conductor 801 rather than a parallel conductor such as conductor 813. The results of these determinations can be displayed on display 810. In some embodiments, signals from each of channels 910, 9111, 912 and 913 can be directly displayed on display 810. In still other embodiments, signal direction is measured on a subset of channels 910, 911, 912 and 913.

In some cases, signals on conductor 801 can be induced on conductor 813. Conductor 813, in response to the induced signals, generates an electromagnetic field 814. Electromagnetic field 814, then, interferes with field 812. The electromagnetic field detected by receiver 803, then, includes contributions from both electromagnetic field 812 and electromagnetic field 814.

Often a signal strength measurement alone can be used to determine whether receiver 803 is detecting fields generated in conductor 813 rather than those generated in target conductor 801. Conductor 813 can be substantially parallel with conductor 801 and close enough to couple—either directly, capacitively or inductively—the signal from conductor 801. Conductor 813, then, generates an electromagnetic field 814 that can become confused by receiver 803 with electromagnetic field 812 from conductor 801.

When signal levels are high, for example when transmitter 802 is still relatively close to receiver 803, the ground return inducted into parallel conductor 813 represents a fraction of the total current in conductor 801. Thus the measured electromagnetic field strength for signals originating in parallel conductor 813 (i.e., the ground return path) will be lower than those originating from conductor 801, and the operator of receiver 803 can compare two readings to determine the likely location of conductor 801.

However, when the electromagnetic field strength of electromagnetic field 812 is already low, even on target conductor 801 (e.g., at increased distances between the transmitter signal source and receiver, or when there are many parallel conductors), the ground return path via parallel conductor(s) 813 represents a higher fraction of the current passing through the target conductor 801. Another difficult measurement situation exists when the depth of target conductor 801 is greater than that of parallel conductor 813, allowing the signal from parallel conductor 813 to more easily mask the signal originating from target conductor 801. Therefore at low signal-to-interference noise ratio (SINR), a signal strength measurement alone may not allow discrimination of forward and reverse signals. Where signals are weak, distinguishing signals generated by target conductor 801 from those generated by parallel conductors 813 based on measurement of signal strengths alone is difficult. Therefore, the measurement of signal direction has the most to offer when the detected electromagnetic field strength is low, though this is when existing methods result in the least accurate signal direction measurements.

In current systems that implement a signal direction indicator, the amplitude of the signal measured from target conductor 801 becomes weaker as the receiver is moved farther from the transmitter, and phase measurement precision is reduced due to noise. In these situations the reliability of the chosen phase reference point (used to evaluate the signal direction) becomes a significant factor. Generally, the loss in signal direction reliability occurs well before the signal strength indication is lost by receiver 803, resulting in reduced effectiveness of the line locate system.

Embodiments of the present invention surmount the obstacles of signal direction measurement in low SINR environments using the signal select method, and results in a more precise phase comparison between the carrier and the FM modulation signals. Furthermore, it is a fully digital architecture that uses only fixed (not tuned) analog filters, while allowing frequency tunability over a wide range.

In some embodiments of the invention, a fundamental algorithm enhancement is included that utilizes nested, digital phase-locked loops to estimate both signal strength and signal direction and that has excellent interference and noise immunity. The interference and noise immunity characteristics can be accomplished through the use of highly stable and narrow bandwidth digital filtering methods.

The substantially all-digital implementation of some embodiments of the detection algorithms has other advantages as can be surmised from the description of problems in practical analog designs described above. For one, calibration issues are minimized, and are concerned only with the characterization of magnitude and phase over fixed analog (and relatively wide) bandwidths. Also, since the analog front-end is designed to be wideband (covering the entire bandwidth of operating frequencies) without restrictive narrowband filter elements, only DSP software changes are necessary to redirect the processing to alternatively selected active frequencies.

Figure 10A:
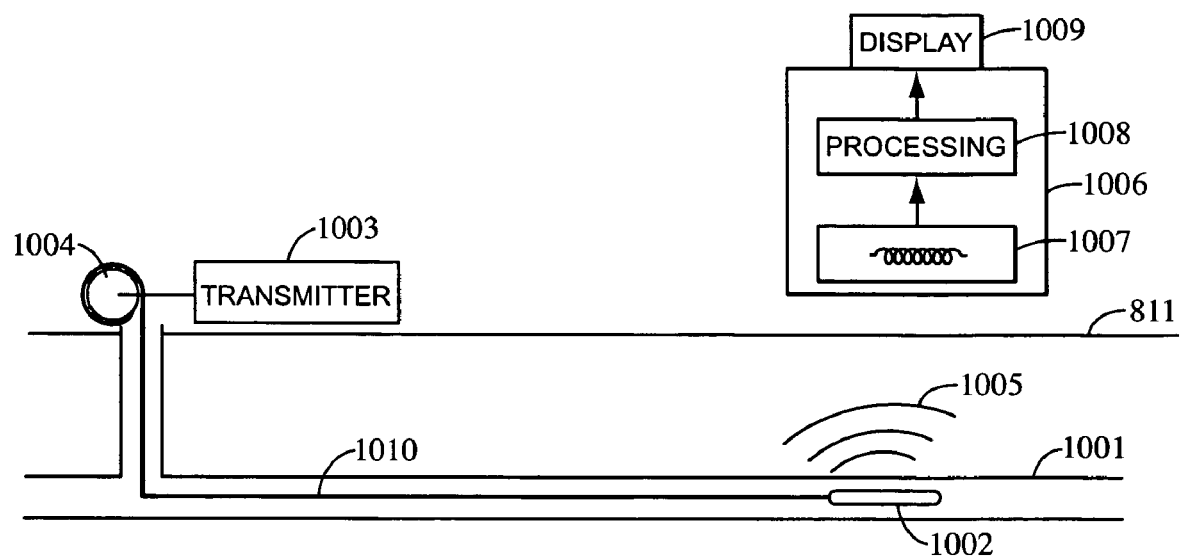
FIGS. 10A and 10B illustrate sonde receiver and marker locator embodiments according to the present invention that detect sondes inserted into pipes or detect markers lying adjacent structures to be found.
Figure 10B:
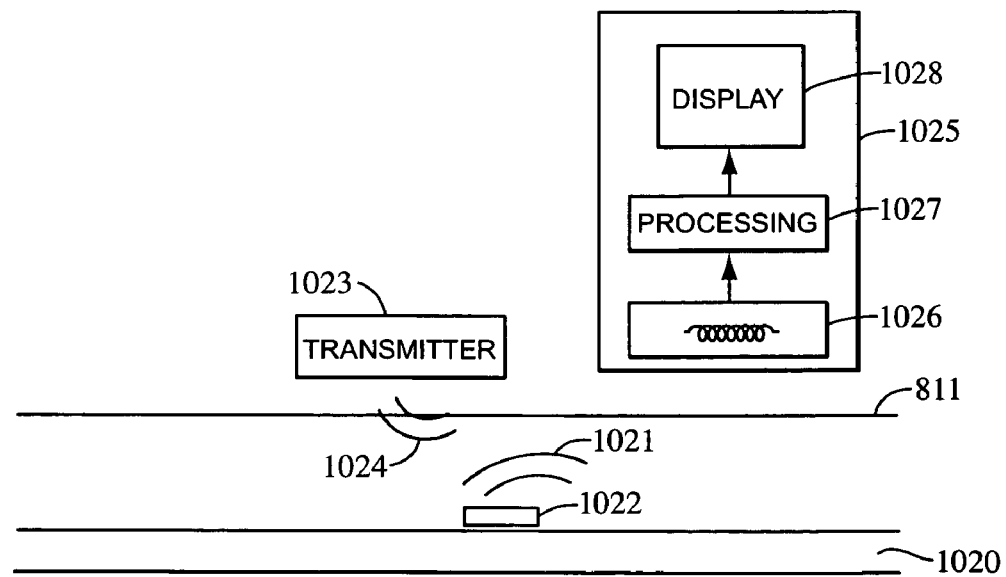

FIGS. 10A and 10B show embodiments of locators according to the present invention for locating the position of a sonde in a pipe (FIG. 10A) or a marker located adjacent a pipe (FIG. 10B). FIG. 10A illustrates a receiver 1006 for detecting electromagnetic radiation 1005 emitted by a sonde 1002. Sonde 1002 may be coupled through a cable 1010, which may also be utilized to tow sonde 1002 through pipe 1001 by winch 1004. Receiver 1006 includes detectors 1007, processor 1008, and a display 1009. Sonde 1002 emits electromagnetic radiation in response to transmitter 1003 that can be detected by detectors 1007 and processed in processor 1008. In some embodiments, transmitter 1003 can be integrated into sonde 1002. Detectors 1007 can, as was indicated in receiver 803, include any number of individual detectors to characterize the field emitted by sonde 1002. Therefore, processor 1008 and detector 1007 may include any number of processing channels.

FIG. 10B illustrates a marker locator system with receiver 1025 and transmitter 1023. In some embodiments, receiver 1025 and transmitter 1023 may be mechanically and electrically coupled. Transmitter 1023 generates electromagnetic field 1024. Marker 1022, which is placed in the vicinity of a structure to be located such as pipe 1020, emits electromagnetic field 1021 in response to electromagnetic field 1024. In some embodiments, marker 1022 may re-emit electromagnetic field 1024. In some embodiments, marker 1022 may utilize electromagnetic field 1024 as a power source in order to generate a separate electromagnetic field 1021. Receiver 1025 again includes detectors 1025 and processor 1027 for receiving and processing electromagnetic field 1021. Again, any number of channels, with any number of detectors, can be utilized. The results from processor 1027 can be displayed on display 1028.

As was discussed with transmitter 802, the electromagnetic radiation being emitted by the target to be located (e.g., conductor 801, sonde 1002, or marker 1022) has a locator, or carrier, frequency. In addition, further information may be encoded on the locator frequency. For example, transmitter 802 may provide an FM modulation frequency on the locator frequency. Additionally, electromagnetic radiation 1005 from sonde 1002 may include an additional modulation on the locator frequency that is either generated by sonde 1002 or by transmitter 1003. Electromagnetic radiation 1021 from marker 1022 may also include additional modulation on a locator frequency.

Although FM modulation is utilized as an example in much of this disclosure, other modulations may be utilized to transmit various types of information. For example, in some embodiments FSK modulation is utilized. In FSK modulation, two closely spaced frequencies are alternatively active at a rate defined by the modulation frequency. In some embodiments, digital data may be transmitted by FSK modulation.

Transmission of digital data may be useful for sonde operation as shown in FIG. 10A, since sonde 1002 and transmitter 1003 is generally physically inaccessible from receiver 1006. Sonde 1002 may transmit data to receiver 1006 regarding its operating status or condition of pipe 1001.

Although many of the algorithms are described in this disclosure with references to block diagrams, the algorithms can be implemented in software, hardware, or in some embodiments a combination of software and hardware. In some embodiments, algorithms described in this disclosure can be implemented on an integrated circuit. The integrated circuit can include a microprocessor and memory to perform any or all of the functions described in this disclosure. Further, the integrated circuit may include dedicated circuitry for performing some or all of the functions described here.

Figure 1:
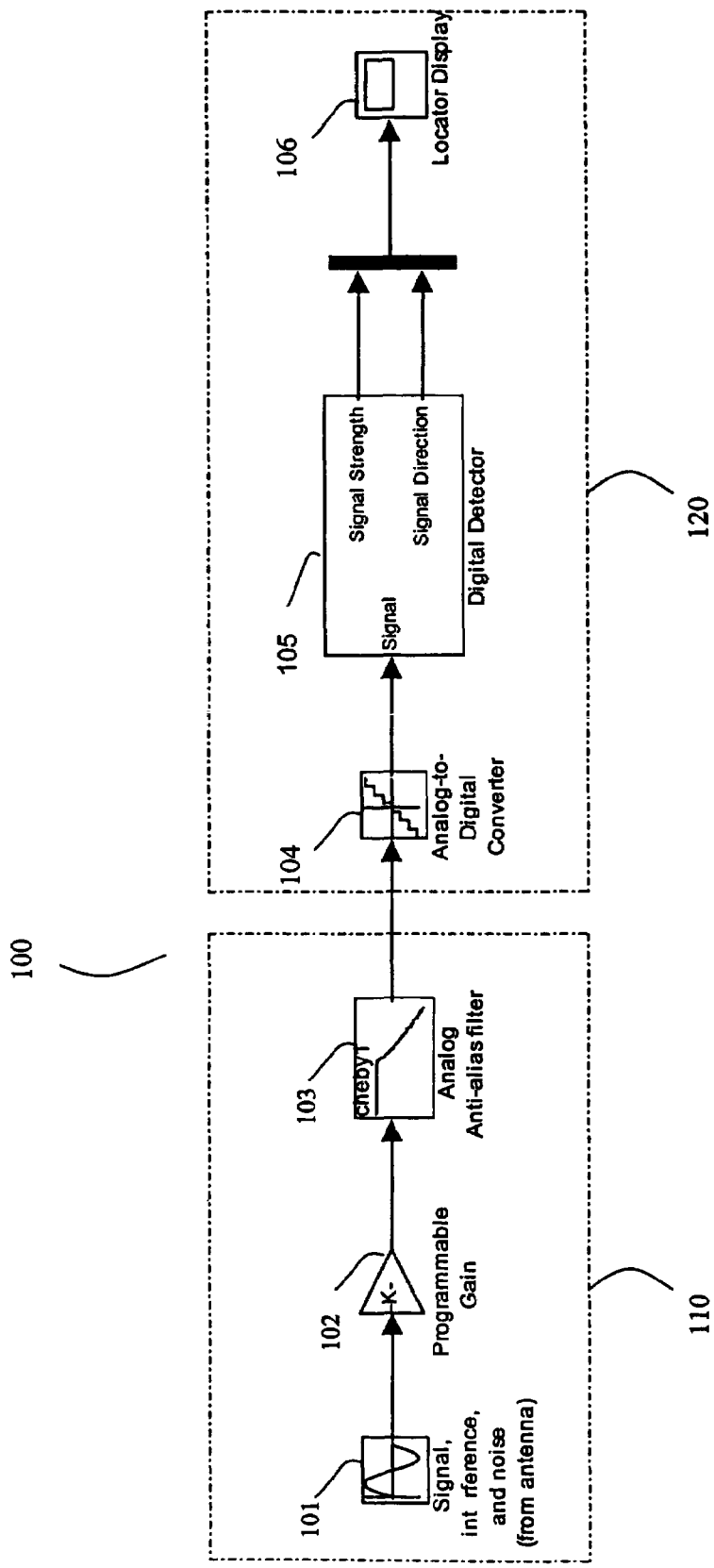
FIG. 1 shows a block diagram of a one-channel embodiment of a line locator according to the present invention.

FIG. 1 depicts a channel 100 of a receiver of a line locator system, for example receiver 803, receiver 1006, or receiver 1025 implemented using digital signal processing techniques according to the present invention. Channel 100 can, for example, be any of channels 910, 911, 912, or 913. In general, a line locator can include any number of individual detectors (or antennas) aligned to detect electromagnetic fields generated by a target such as target conductor 801. In some line locator systems, for example, receiver 803 shown in FIG. 8 includes four coil antennas 805, 806, 807 and 808 arranged such that two, separated vertically, measure horizontal components of a magnetic field generated by the conductor and two, separated horizontally, measure vertical components of the magnetic field generated by the conductor. Such a design is further described in U.S. Pat. No. 6,407,550, "Line Locator with Accurate Horizontal Displacement Detection," by Gopalakrishnan Parakulum and Stevan Polak, which has been incorporated by reference into this disclosure. Channel 100 can represent the data processing channel from any one of antennas 805, 806, 807, and 808, or may represent a data processing channel in receiver 1006 or receiver 1025.

Signals from detector 101 are received at programmable gain amplifier 102. After amplification, the signals are filtered in a low-pass anti-aliasing filter 103. Digitization of the signal occurs in analog-to-digital converter 104, which receives the output signal from filter 103. The digitized signal is input to digital detector 105. Parameters calculated in digital detector 105 can then be displayed on locator display 106 or input to a process for calculation of other parameters such as location and depth of conductor 801 in receiver 803, for example. Detector 101 can be any of antennas 805, 806, 807 and 808, for example, of FIG. 8, detectors 1007 shown in FIG. 10A, or detectors 1026 shown in FIG. 10B.

Although much of the present disclosure is directed to line locator system 800, the principles of the detection and signal processing disclosed here are applicable to marker locator systems as shown in FIGS. 10A and 10B. Amplifier 102, filter 103, ADC 104, and digital detector 105 can, for example, be included in signal processor 809 of FIG. 8. Further, display 810 of FIG. 8 may, for example, include locator display 106.

Channel 100 includes an analog section 110 and a digital section 120. Analog section 110 can have a fixed bandwidth, which is wide enough to accommodate the desired set of possible active locate frequencies for the line location system. In systems used for metallic pipe and cable locations, a bandwidth of about 100 kHz is typical.

In some embodiments, analog-to-digital converter (ADC) 104 samples at rates at least twice the desired analog bandwidth, though this is not an absolute requirement for the measurement of narrowband signals (as is the case for line locators). An undersampled data sequence, i.e. one that is open to aliasing, can result in equally accurate measurements since the position of the aliased components of the signal are known and can be digitally discriminated by appropriate further filtering. For example, if the ADC sample rate is 200 kHz and the analog anti-alias filter 103 has a bandwidth of about 100 kHz, some aliasing of the spectrum between about 100 and about 200 kHz will occur because filter 103 cannot be perfect.

Because the dynamic range of ADC 104 is typically around 80 dB, a zero to 40 dB programmable gain stage 102 may be utilized to amplify low signal levels from antenna 101. Use of a 0 to 40 dB gain stage allows receivers according to the present invention to compare favorably with other systems that offer about 120 dB dynamic range in order to operate effectively over a long distance from the transmitter or to locate deeply buried utility lines. The gain of amplifier 102 may be user selected.

The circuit of channel 100 shown in FIG. 1, then, is a data acquisition system having a 100 kHz bandwidth, coupled to a DSP (digital signal processor) and display device. Absent from channel 100 shown in FIG. 1 are tunable filter stages that are common in existing line location systems that act to discriminate the analog signal of interest (e.g., the signal responsive to electromagnetic field 812 from target conductor 801) from other signals prior to sampling in the digital domain.

As is indicated in FIGS. 8 and 9, each detector antenna in receiver 803 can belong to a data processing channel 100. Therefore, several of channel 100, combined together, can constitute a complete line locator with outputs of target conductor current, depth, and centerline position (all derived from a combination of signal strength output signals). As described above, signal direction indication also has importance to ensure that the targeted conductor carrying the active locate signal is not inadvertently lost through coupling to a parallel line (e.g., conductor 813) during the location process. In the present invention, several measurement channels (identical to the single channel structure shown in FIG. 1) can be combined together and processed together on a single DSP processor.

Figure 2:
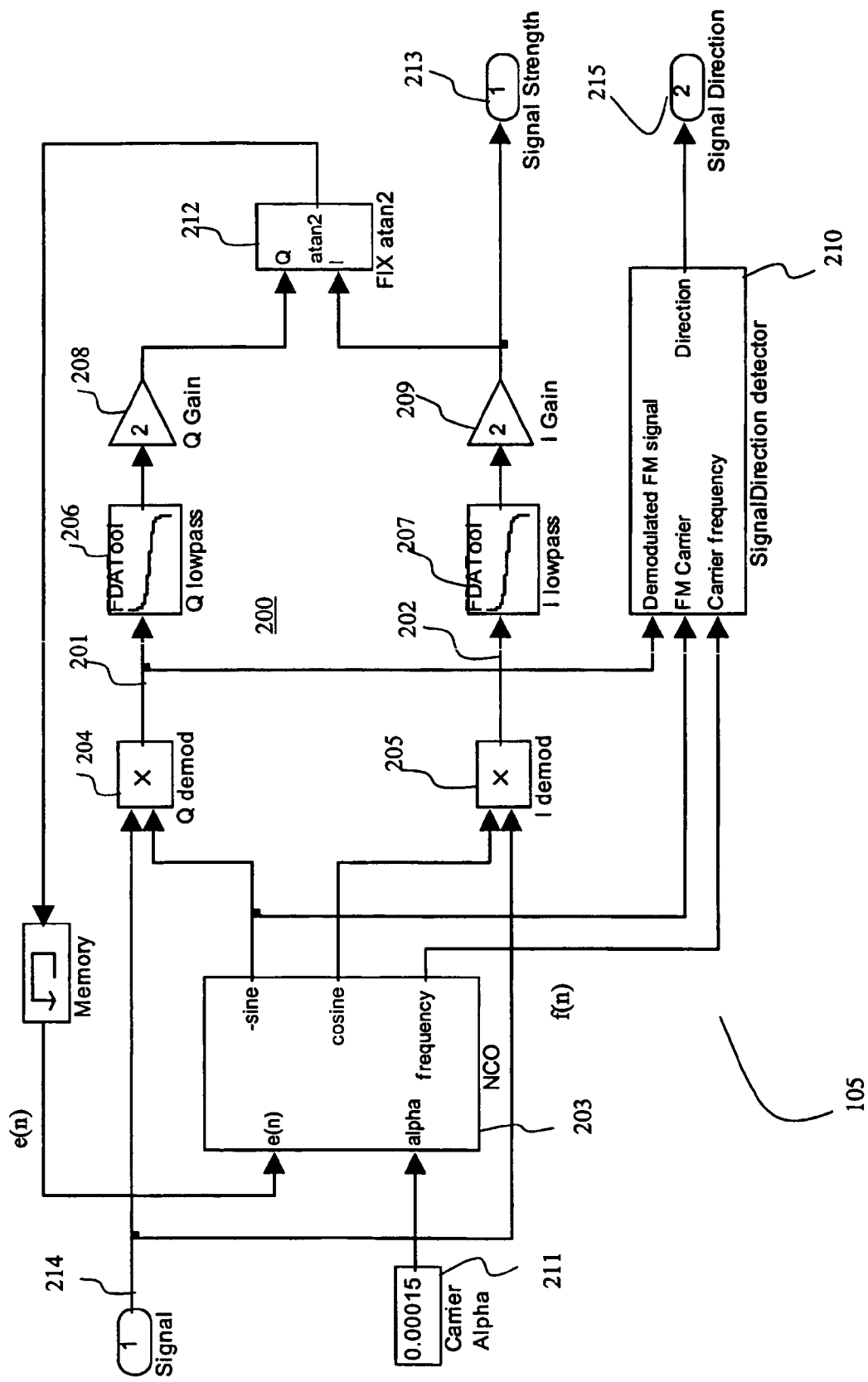
FIG. 2 shows a block diagram of an embodiment of a digital phase-locked loop (DPLL) used to estimate the electromagnetic signal strength according to the present invention.

Digital detector 105 includes DSP processing blocks according to the present invention. FIG. 2 shows an embodiment of digital detector 105 that includes a completely digital phase-locked loop (DPLL) 200 that operates at the sampling rate of ADC 104. The embodiment of DPLL 200 shown in FIG. 2 has the structure of a Costas Loop. The purpose of DPLL 200 is to "lock on" to the active locate frequency of the signal coupled to target conductor 801 by transmitter 802. DPLL 200 includes an upper leg 201 and a lower leg 202. Upper leg 201 and lower leg 202 of DPLL 200 represent the quadrature and in-phase components demodulated from the signal output from digitizer 104.

Upper leg 201, the quadrature component processing leg, includes multiplier 204, lowpass filter 206, and amplifier 208. Lower leg 202 includes multiplier 205, lowpass filter 207 and amplifier 209. A numerically controlled oscillator (NCO) 203 generates both sine and cosine signals at close to the active locate frequency (or substantially the active locate frequency, when DPLL 200 is "at lock"). A negative of the sine signal generated by NCO 203 is input to multiplier 204 along with input signal 214, the signal output from ADC 104. The cosine signal generated by NCO 203 is input to multiplier 205 along with input signal 214.

The output signal from multiplier 204 and multiplier 205 includes sum frequency and difference frequency components (i.e., as is shown, for example, by the trigonometric identities:

$$\sin(A)\sin(B) = \tfrac{1}{2}\cos(A-B) - \tfrac{1}{2}\cos(A+B)). \quad \text{(EQN. 1)}$$

$$\sin(A)\cos(B) = \tfrac{1}{2}\sin(A-B) + \tfrac{1}{2}\sin(A+B)). \quad \text{(EQN. 2)}$$

The sum frequency component can be removed by a lowpass filter. If the frequency output signal from NCO 203 is substantially the same as the frequency of the input signal 214, then the difference frequency signal is substantially a DC signal. The sum component signal, from multipliers 204 and 205, which is substantially at twice the frequency of input signal 214, is removed by lowpass filters 206 and 207, respectively. The amplitude of the output signals from filters 206 and 207, which now include only the difference components of the signals output from multipliers 204 and 205, are doubled in amplifiers 208 and 209, respectively, so that the in-phase difference signal and quadrature difference signal are scaled to full amplitude by gain stages 208 and 209, respectively. The resulting signals are close to DC signals and are combined to create a phase error signal e(n) in phase error block 212. In some embodiments, phase error block 212 executes a fixed-point inverse tangent approximation.

Using a fixed-point inverse tangent approximation, for example, determination of the phase error is independent of input signal amplitude. At lock, the phase error is approximately zero and the in-phase output signal from amplifier 209 represents the signal strength 213. Because the bandwidth of filters 206 and 207 is narrow (on the order of 2 to 5 Hz), signal strength output signal 213 can be directly presented in readable form to the operator via display device 106 (FIG. 1). Some embodiments may apply an additional smoothing filter to signal 213 prior to display, to improve the readability of the signal strength quantity without changing the bandwidth of lowpass filters 206 and 207.

The narrow bandwidth of lowpass filters 206 and 207 provides excellent interference rejection while still allowing enough lock range for DPLL 203 to accommodate normal crystal variations in transmitter 802. In practice, to reduce requirements on the absolute accuracy of the active locate frequency generated by transmitter 802, the initial frequency of receiver NCO 203 can be adapted during the "lock acquisition" phase of operation (just after the unit is switched on, for example) to accommodate a wider range of frequency variations while maximizing interference rejection (e.g., the bandwidth of lowpass filters 206 and 207) around the demodulated carrier frequency, i.e. the active locator frequency. After each iteration, the NCO frequency output signal f(n) can be tested to find the lowest phase error for use with a given transmitter. Thus, filters 206 and 207 may have narrow bandwidth but the range of allowable transmitter frequencies around a designated nominal active locate frequency is increased.

Figure 3:
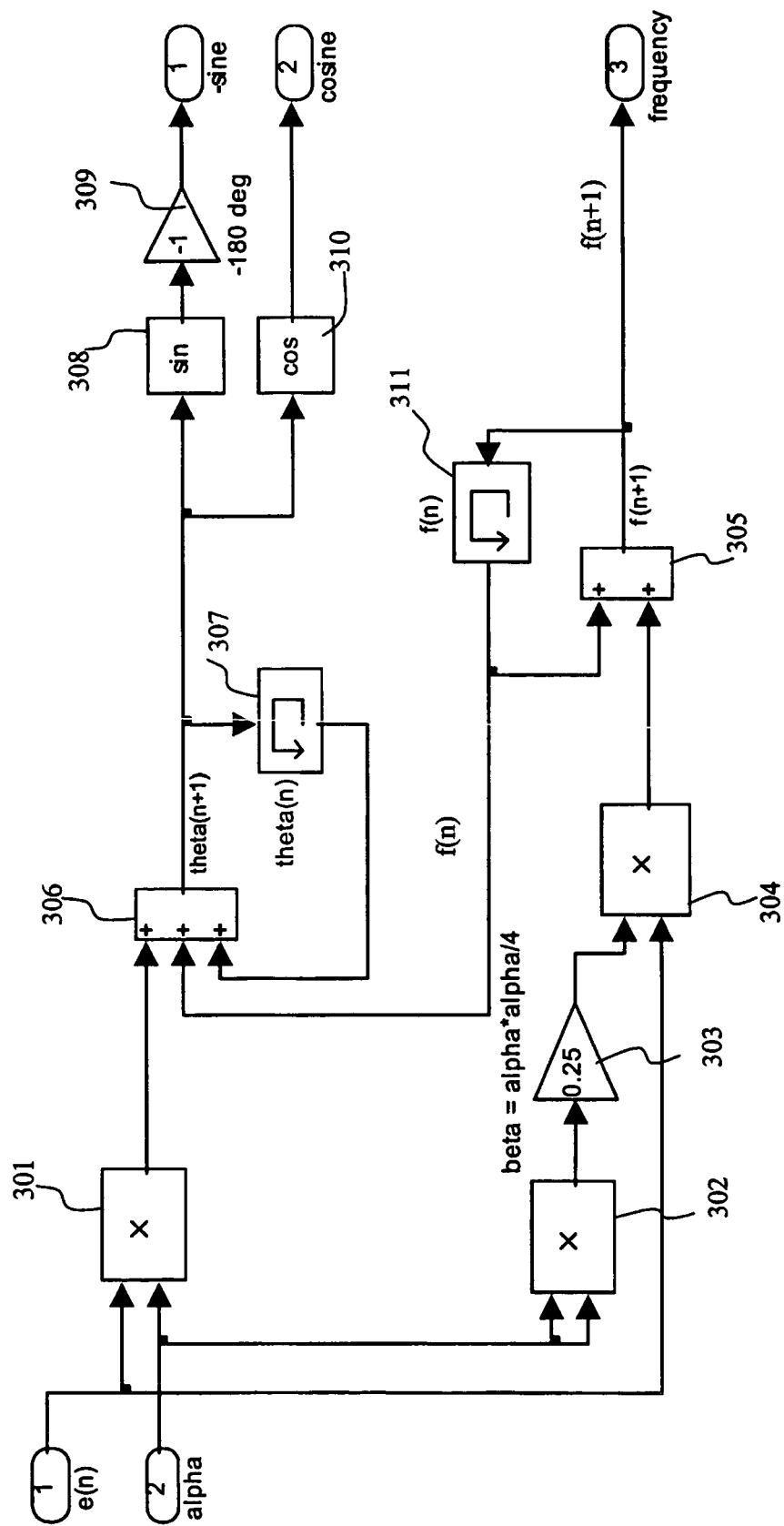
FIG. 3 shows a block diagram of an embodiment of a numerically controlled oscillator (NCO) of a DPLL such as that shown in FIG. 2, according to the present invention.

FIG. 3 shows an embodiment of NCO block 203 according to the present invention. NCO block 203 takes as input the phase error e(n) and a feedback coefficient denoted as carrier alpha ($\alpha$). In some embodiments, NCO 203 executes the solution of a second order system that simultaneously updates both the carrier phase increment $\theta(n)$ and current frequency f(n). Through controlled feedback, NCO 203 provides both a smoothed representation of the carrier phase $\theta(n)$, as well as a current frequency f(n). The frequency estimate slowly adjusts to the mean value of the active locator frequency generated by the FM modulated transmitter 802.

The loop update equations executed by NCO 203 can be given by:

$$\theta(n+1) = \theta(n) + \alpha e(n) + f(n) \quad \text{(EQN. 3)}$$

$$f(n+1) = f(n) + \beta e(n) \quad \text{(EQN. 4),}$$

where $\theta(n)$, f(n), and e(n) represent the phase angle, frequency, and phase error of the current time step, respectively. The parameters $\alpha$ and $\beta$ represent the feedback coefficients and can be provided as user selectable inputs. EQNs. 3 and 4 can be utilized to predict the next values of frequency f(n+1) and phase $\theta(n+1)$ to apply to the closed loop system of DPLL 200. After performing a Z-transformation, and some algebraic manipulation, a solution for the case that results in real poles (since real poles do not resonate) is the critically damped solution $\beta = \alpha^2/4$.

The solution, with $\beta = \alpha^2/4$, is implemented in the embodiment of NCO 203 shown in FIG. 3. The phase error signal e(n) output from phase error block 212 is input to multiplier 301. The carrier alpha input value $\alpha$ is input to multiplier 301 and multiplier 302. In multiplier block 302, the value $\alpha$ is squared and in amplifier 303 the squared value is divided by 4 to calculate $\beta$ according to the results of the critically damped solution. The value $\beta$ is multiplied by the input phase error e(n) in multiplier block 304 and summed with the last frequency f(n) in summer 305 in order to calculate the value f(n+1) as indicated in EQN. 4 above. The value f(n+1) is delayed in delay block 311 for calculation of the next frequency value.

In multiplication block 301, the phase error e(n) is multiplied by the input value $\alpha$. The output signal from multiplication block 301 is summed with the last phase value $\theta$(n) and the last frequency value f(n) in summer 306 to form $\theta$(n+1). The value of phase $\theta$(n+1) is input to sine and cosine blocks 308 and 310, respectively. The new value of $\theta$(n+1) is also input into delay block 307 to be utilized in the next iteration.

Therefore, the solution of EQN. 4 with $\beta = \alpha^2/4$ is implemented in multiplier block 302, amplifier block 303, multiplier block 304 and summer block 307 of FIG. 3, and the loop update equation of EQN. 3 is implemented in multiplier block 301, summer block 306, and delay block 307. The choice of carrier alpha $\alpha$ is left as an input to NCO 203. A value of about 0.00015, however, works well for the sample rates and filter bandwidths common to locator systems.

The sine and cosine blocks 308 and 310 in FIG. 3 can be replaced with corresponding lookup tables so that the real-time efficiency of NCO 203 can be improved. Likewise, multipliers 301, 302, and 304 can be implemented using fixed-point arithmetic for the same reason. Arithmetic issues are also important in the update of $\theta$(n+1) in summer 306 in FIG. 3. If the phase angle $\theta$(n) were allowed to increment ad infinitum, eventually the accuracy of NCO 203 will suffer since a computer based number system cannot represent unbounded numbers accurately. Thus, a practical implementation of NCO 203 includes a modulo $2\pi$ circuit to control the growth of $\theta$ in summer 306.

Amplifier 309 provides a gain of −1 applied to the output signal from sine block 308. This is necessary to create negative feedback of the phase error term and thereby drive the system to a lock state.

In FIG. 2, the calculation of signal direction is based in part on the sine signal output by NCO 203 (−sin $\theta$ as output by amplifier block 309), and the unfiltered output signal of quadrature multiplier 204. In accordance with certain aspects of this invention, the sine signal output by NCO 203 is a highly phase stable representation of the actual carrier frequency, with greatly reduced phase jitter, compared to the input signal 214 (due to the filtering of the phase-locked loop shown in FIG. 2).

Figure 4:
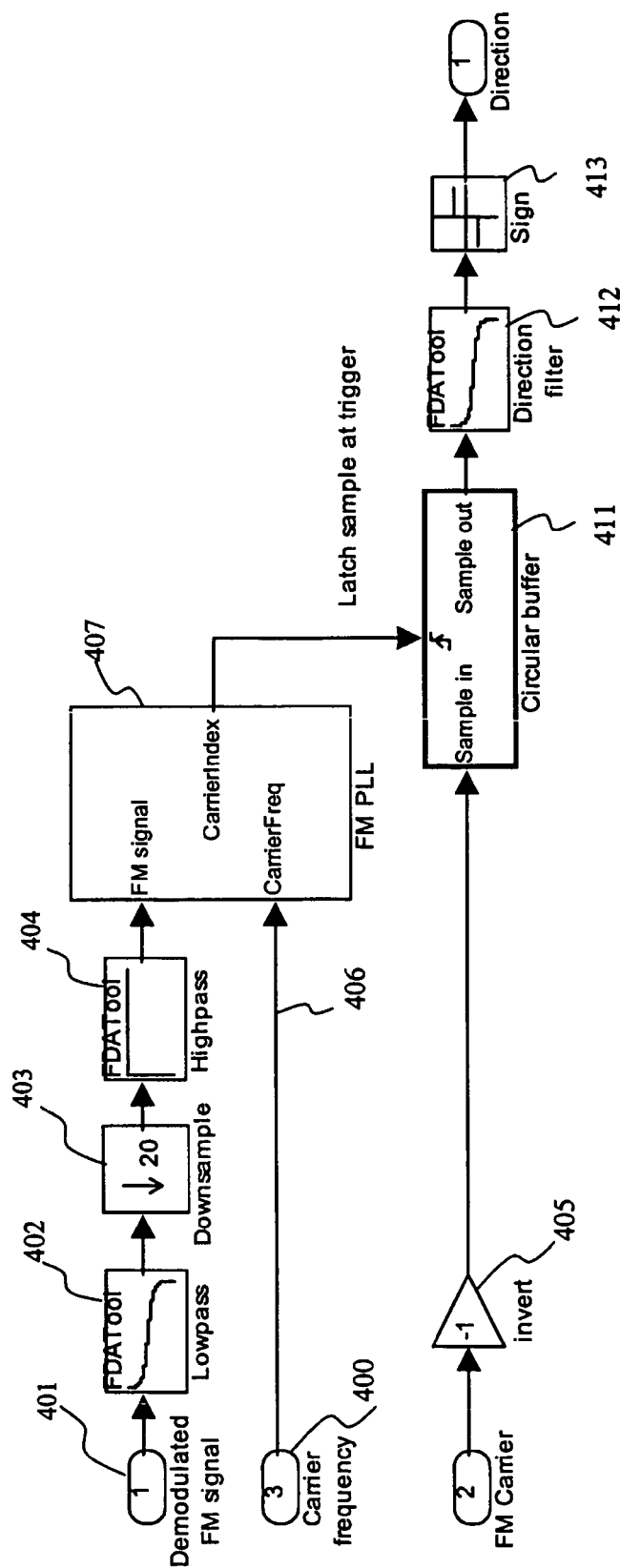
FIG. 4 shows a block diagram of an embodiment of a signal direction indicator according to the present invention.

An embodiment of signal direction block 210 is shown in FIG. 4. Recall that, in some embodiments, the active locating frequency is actually a signal select modulated FM signal with a phase reference defined at transmitter 802. Other modulations, such as FSK, for example, can also be utilized. The FM modulation frequency is much lower than the carrier frequency (by a factor of 20 to 100). Thus, from the standpoint of DPLL 200 shown in FIG. 2, the demodulated FM signal 401, the output signal from Q-demod multiplier block 204, is a phase error term, since it does not comply with the expected phase of the active locating frequency carrier. By virtue of the narrow bandwidth quadrature lowpass arm filter 206, the phase error update to NCO 203 is not allowed to ramp fast enough to track the FM modulation (in some embodiments, the bandwidth of the Q-lowpass block 206 is only 2 Hz for a carrier frequency of 10 kHz, still lower by a factor of 50 to 250 than the FM modulation frequency).

So from the perspective of the DPLL 105, the carrier is actually the mean frequency measured over many FM modulation periods. The feedback control loop adapts at a slower rate than the FM modulation frequency, and thus the state of the FM signal 401 is available at every sample period. Signal 401 is an estimate of the FM demodulated signal and is one of the inputs to signal direction detector 210, FIG. 4.

In some embodiments, signal 401, filtered by filters 402 and 404 is input to a second "nested" phase-locked loop (or FM DPLL) 407, which locks onto the FM modulation signal, or other modulation signal, creating an almost pure sinusoidal representation of the modulation as originally imparted at transmitter 802, for example. FM DPLL 407 provides excellent phase noise immunity and interference rejection which results in a consistent FM carrier phase detection and therefore highly accurate signal direction estimation.

Once FM DPLL 407 is locked, FM DPLL 407 generates a carrier index parameter to determine the exact sample at which to extract the direction from the FM carrier signal inverted by amplifier 405. The purpose of the inversion is to undo the operation of amplifier 309, which is not desirable for the purpose of computing signal direction based on the sense of the NCO FM Carrier output signal, the −sine signal, from NCO 203. The carrier index parameter, as is further discussed below, can be determined by a digital comparison of the locked phase with the value $\pi$ and a zero crossing detector. In buffer 411, the output signal from amplifier 405 is sampled in accordance with the carrier index output from FM DPLL 407.

An output filter 412 coupled to receive the sampled output signal from buffer 411, which is a latched direction indication, smoothes the result for display purposes in the timeframe before FM PLL 407 is locked. When both FM DPLL 407 and carrier DPLL 200 in the system are locked, the signal direction indication remains fixed at either positive or negative readings (i.e., there is no need for filter 411 to filter the signal direction output when the system is in a locked state).

Reliable phase comparison of demodulated FM signal 401 with the FM carrier (or more precisely, the inverted NCO 203 representation of the carrier signal output from amplifier 405) requires filtering of the demodulated FM signal. For example, the sum frequency component of demodulation signal 401 has not yet been removed. The FM modulation frequency is known precisely, so an effective bandpass filter is designed to pass that frequency and attenuate all others. In FIG. 4, this is shown as a cascade of lowpass filter 402 and highpass filter 404, to ease the implementation of the narrow filter on fixed point DSP processors. The purpose of this filter arrangement is to remove the sum of frequencies resulting from multiplier 204, as well as to provide DC rejection.

However, even after implementation of filters 402 and 404, phase jitter persists on the FM demodulation signal due to interference and noise, and as a consequence a poor detection of the signal direction would still result. In accordance with some embodiments of the present invention, FM DPLL 407 is operated on the demodulated and filtered FM signal 401. This "nested PLL" scheme dramatically improves the performance of the signal direction estimation, allowing the receiver to lock to the FM signal precisely.

Because there is no longer any need to provide a carrier phase update on every ADC sample, the sampling rate can optionally be dropped prior to implementation of FM DPLL 407, for example by a factor of about 20 to 100 (depending on the ratio of the carrier frequency to the FM demodulation frequency). This saves computational resources and thus lowers the implementation cost of incorporating the FM DPLL 407. In FIG. 4, a decimator 403, which can be a 20:1 decimator, follows lowpass filter 402. Once the bandwidth of signal 401 is limited to the FM modulation frequency (e.g., 1/20 of the FM carrier frequency), digital samples can be discarded without encountering aliasing problems. In some embodiments, filter block 402 and decimation block 403 can be a single decimation filter block implemented using a polyphase approach (for maximum efficiency).

Figure 5:
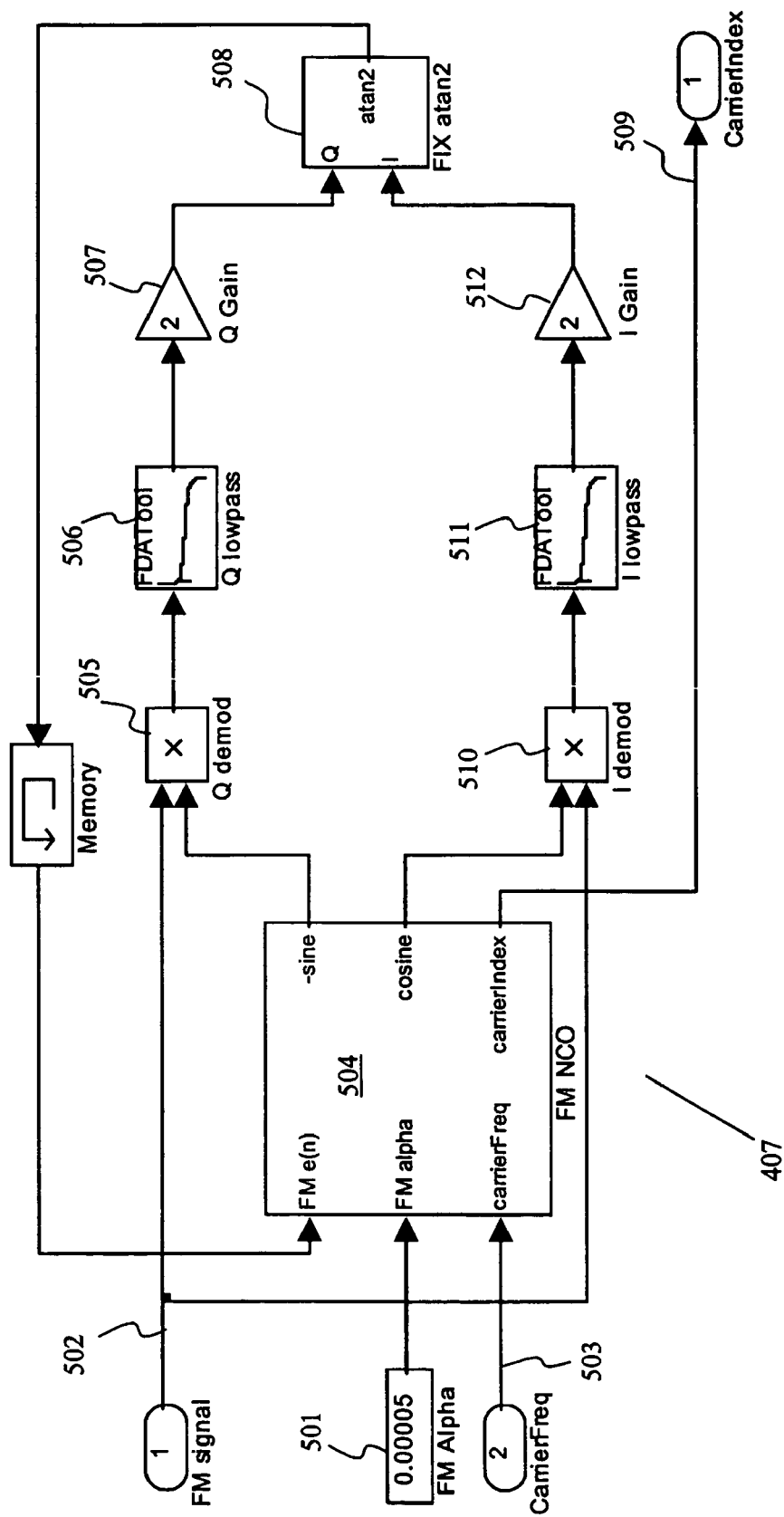
FIG. 5 shows a block diagram of a second, nested, DPLL such as that shown in the signal direction indicator of FIG. 4.

At this reduced sample rate, FM DPLL 407 (shown in FIG. 5, with a very similar topology to that shown in FIG. 2) locks to the FM signal using a quadrature detection method. As shown in FIG. 5, the output signal from DC blocking filter 404 is input to FM NCO 504 as signal 502. Carrier frequency 503, which is the frequency output signal f(n) from NCO 203, is also input to FM NCO 504. Additionally, a settable FM alpha value 501 is input. (In practice, the specific value of FM alpha is programmatically supplied in the DSP implementation of the line locator receiver, and is not a parameter present at the user interface). Each of input signal 502, FM alpha 501, and carrier frequency 503 are input to FM NCO 504. FM NCO 504 provides a sine signal and a cosine signal for use in multipliers 505 and 510. Also, FM NCO 504 outputs a carrier sample index used to denote at which FM carrier sample the signal direction should be determined.

A negative of the sine signal is mixed with input signal 502 in multiplier 505 in the quadrature arm of the feedback loop. The output signal from multiplier 505 is filtered in low-pass filter 506, which removes the sum-frequency component of the output signal from multiplier 505 and leaves the difference frequency component. The resulting nearly DC level signal is amplified, for example by a factor of 2, in amplifier 507. The resulting signal is input to phase error block 508.

Similarly, in the in-phase arm, input signal 502 is mixed with the cosine signal from FM NCO 504 in multiplier 510. The output signal from multiplier 510 is filtered in low-pass filter 511 to remove the sum-frequency components and leave the difference-frequency components. The output signal from low-pass filter 511 is amplified in amplifier 512, for example by a factor of 2. The output signal from amplifier 512 is also input to phase error block 508.

Phase error block 508 calculates an error signal FM e(n) based on the output signals from amplifiers 507 and 508. The error signal FM e(n) can be calculated utilizing a fixed-point inverse tangent approximation.

The lowpass filters 506 and 511 on both the in-phase and quadrature arms of the FM DPLL 407 can each have bandwidths of about 2 Hz, resulting in a significant reduction of noise over the FM signal that is present at the input of the signal direction block.

FM DPLL 407 behaves in a similar way to the top-level carrier DPLL 200 (FIG. 2), including the adjustment of gain in amplifiers 507 and 512 on each of the in-phase and quadrature arms and the calculation of the phase error in phase error block 508 using a fixed-point inverse tangent approximation.

FM NCO 504 differs from the carrier NCO 203 in that there is no need to adapt both frequency and phase. In signal select based transmitter systems, the FM demodulation frequency is synchronous and has a known relationship to the carrier. Because NCO 203 results in an output that is the estimated carrier frequency, this is used as input to FM NCO 504. Thus, FM NCO 504, an embodiment of which is shown in FIG. 6, implements the solution of only a first order system (adjustment of phase only).

Figure 6:
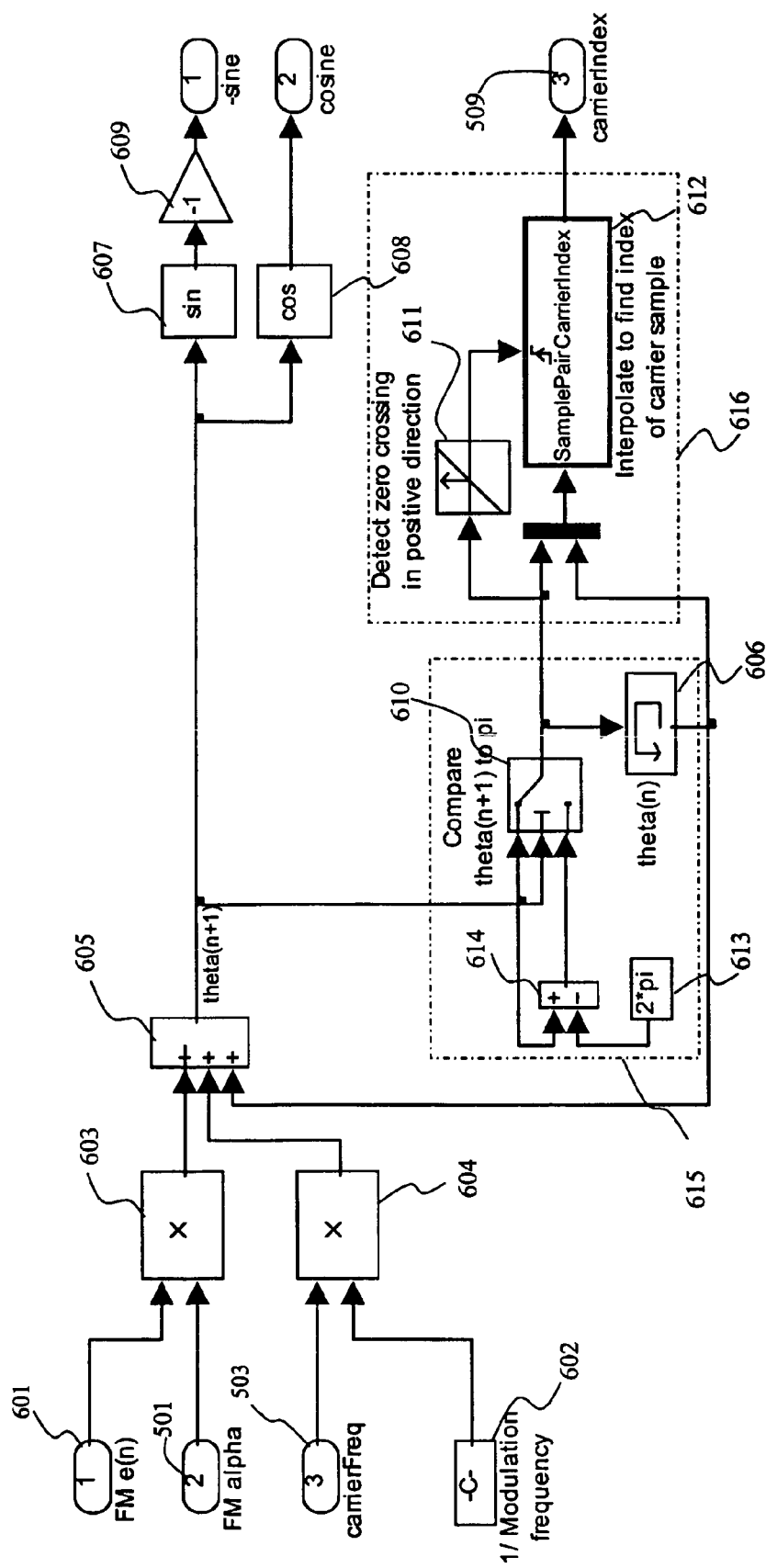
FIG. 6 shows a block diagram of an embodiment of the NCO shown in the DPLL of FIG. 5.

As shown in FIG. 6, the FM alpha parameter 501 is multiplied by the FM error signal 601 in multiplier 603. The carrier frequency signal 503 is multiplied by constant 602 in multiplier 604. Constant 602 is the known ratio of modulation frequency to carrier frequency, which in some embodiments can be a factor of 1/20 to 1/100. The output signals from multipliers 603 and 604 are summed in summer 605 with the FM phase to generate the updated phase angle FM θ(n+1). Delay block 606 provides the phase to summer 605 for the next iteration. As previously noted, modulo block 615 can be a phase wrap circuit to avoid numerical computation issues that would result for a constantly increasing value of θ. Comparator 610 compares θ with π and, if θ becomes larger than π, then the value θ−2π calculated in summer 614 is presented to delay 606 rather than θ. The phase θ is forced, therefore, to range from −π, to +π.

The FM phase θ(n+1), the modulated signal, can be utilized in calculation of the sine signal in sine block 607 and the cosine signal in cosine block 608, which are inputs to FM PLL 407, the nested phase-locked loop. The sine signal can be inverted by inverting amplifier 609 before being output from FM NCO 504. FM alpha parameter 501 is programmatically selectable; however, a value of about 0.00005 provides useful performance.

Figure 7:
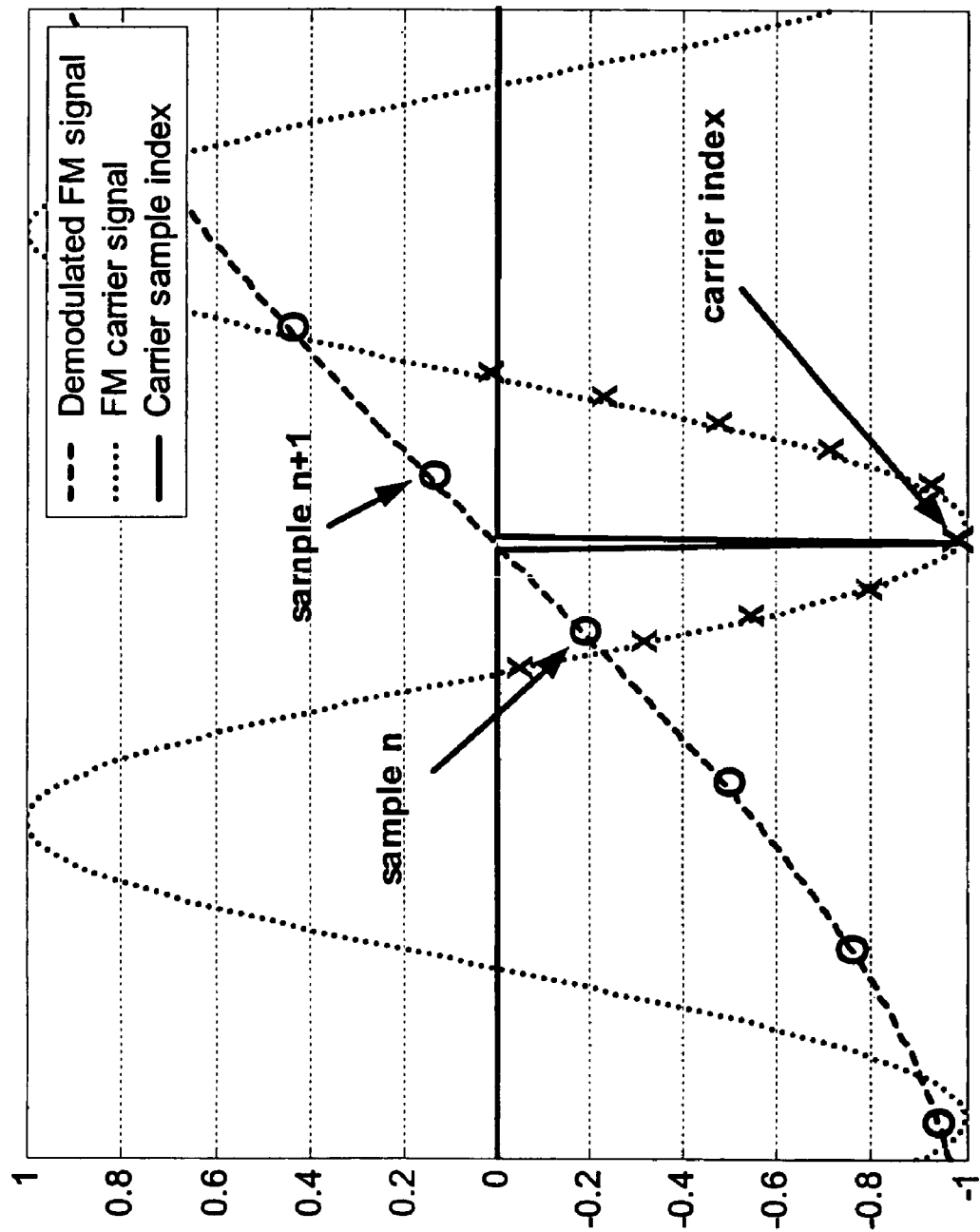
FIG. 7 is a graph that illustrates the phase comparison of the NCO carrier signal with the FM demodulation NCO signal.

Index block 616 of the FM NCO 504 calculates the carrier index output signal for circular-buffer 411. Because the phase is forced via comparator 610 to be negative on every cycle at the FM modulation frequency, a zero crossing detector 611 provides a trigger to interpolation block 612 when the FM phase θ(n+1) is positive and θ(n) is negative. The objective of the linear interpolation block is to determine the exact FM carrier sample index at which to determine the signal direction. The interpolation is necessary in some embodiments to save computational resources because FM DPLL 407 operates at a sample rate reduced from the ADC sample rate by the ratio of the FM modulation frequency to the FM carrier frequency in decimator 403 (FIG. 4). After the interpolation, carrier index signal 509 represents the index of the appropriate sample, relative to the sample time denoted by θ(n). The carrier index, then, refers to the nearest sample of the carrier (at the ADC sampling rate) at which the phase signal θ crosses 0, and at which the sine signal from NCO 203 is sampled in buffer 411 to determine signal direction. FIG. 7 shows the interpolation process, identifying the carrier index based on the detected zero crossing between θ(n) and θ(n+1). The signal direction is determined from the sample referred to by carrier index 509.

Returning to FIG. 4, a circular buffer 411 holds FM carrier samples. The sample capacity of buffer 411 is slightly larger than the ADC sample rate multiplied by the FM carrier period, to accommodate deterministic filter group delays due to filters 402 and 404. Circular buffer 411 accepts a trigger input, the value of which is the carrier index 509. The sample in the buffer at that relative offset (biased by known filter delays) is copied to the output of buffer 411. From this sample, the signal direction indication is derived. If the sample has a negative value, the signal direction is taken as negative, otherwise it is positive. The sign of the sample is determined in sign block 413. A signal direction determination can be performed at every positive-going zero crossing of FM phase θ(n+1). However, this rate of direction determination is not normally necessary, since the loop time constants (and by extension the rate of change of phase of the FM signal with respect to the carrier signal) are dictated by loop filters (low pass filters) 506 and 511, which have very narrow bandwidth. The operation of the line locating instrument is satisfactory if an accurate estimate of the signal direction parameter is provided several times per second.

The convention used by signal select based transmitters to define the phase relationship between the FM modulation and FM carrier can be referred to the zero crossing detected by interpolation block 609. One such convention is to define zero crossing when the FM modulation is midway between the maximum and minimum frequency. Since the demodulated FM signal 401 is a result of quadrature multiplication 204 as indicated by Equation 1, the output signal will be exactly 90° out of phase with the FM carrier sinusoid. Therefore, the zero crossing of FM phase θ(n+1) takes place precisely at the peak (either positive or negative) of the FM carrier signal.

In accordance with the present invention, the selection of the ratio of the FM modulation frequency to the FM carrier frequency is decoupled from determination of the desired level of interference rejection. As described in the background discussion above, these parameters are coupled in present implementations of the signal select method. When the FM modulation frequency is increased to ratios larger than 1/100 of the carrier frequency (allowing a relaxation of the accuracy of the phase tolerance to a few degrees), the traditional method of estimating signal direction is subject to increased interference noise. The method described herein does not have this limitation because of the second, nested DPLL that locks onto the error output of the first DPLL (representing the demodulated FM signal), e.g., FM DPLL 407. Even though there is still an explicit phase comparison with the new method (as embodied in the zero-crossing detector 611 and interpolator 612), the precise filtering of the nested DPLL system dampens changes in the signals being compared so that the process is much less sensitive to noise.

Embodiments of this invention make possible use of much larger ratios of FM modulation to FM carrier frequency. A ratio as large as 1/5 with phase tolerance +/-18° in the FM demodulation signal phase, has been shown to have essentially the same SINR performance as for the ratio of 1/50. The overall performance of the nested DPLL approach described herein is based solely on the bandwidths of the lowpass filters utilized in the feedback loops and the phase error feedback equations, rather than the FM modulation parameters.

FIG. 7 shows a graph of the phase comparison between the Demodulated FM signal (from the NCO cosine function 608), and the FM carrier signal 405 (derived from NCO 203), at the carrier sample index 509. In the example illustrated in FIG. 7 in which both DPLLs are locked, the carrier frequency is 491 Hz, the ADC sample rate is 10 kHz, and the ratio of FM modulation to FM carrier frequency is only 5 (modulation frequency=98.2 Hz). Even though the noise level is quite high (SINR=5 dB, narrowband interference at 442 Hz), both signals shown in FIG. 7 are very pure sinusoids and have exceptionally stable phase. The signal direction result 410 is also stable because each of the two nested digital phase-locked loops has relatively long time constants (due to the filter bandwidths used in the loop). The output signal 410 represents the signed signal direction, which in this case is negative (as shown by the negative going trigger in FIG. 7).

By extension, the described method of nested digital phase-locked loops can also be used to improve the phase accuracy of other variants of signal direction estimation, like those commonly known as current direction. It is apparent that all such methods described in the literature involve a convention used by the transmitter to control the phase between at least two sinusoids having known phase relationships to each other. The nested DPLL methods described herein can be adapted to these other conventions. For example, the top-level carrier DPLL can detect the fundamental continuous wave carrier frequency, and provide a divided (or multiplied) signal to a second nested DPLL to extract the phase of the second sinusoid. This will have the same interference rejection property of the described invention, since interference in the bandwidth between and outside of that fundamental sinusoid and the second sinusoid will be rejected by the combination of the two DPLLS.

For example, in U.S. Pat. No. 6,549,011, a special set of integers is suggested to configure a current direction detection system. These integers N, M must satisfy the equation N*F1=M*F2, must be non-adjacent, greater than 1, with no common factors, and either N or M must be odd and the other even. Recall that this method requires the designation of a phase reference point somewhere on the conductor. For reasons presented above, it is desirable that F1 and F2 not be far apart, lest channel effects cause the relative phase between the frequencies to diverge as the separation distance between the current measurement and the arbitrary phase reference point grows.

One choice of N, M satisfying these constraints, as well as resulting in minimal frequency separation between F1 and F2 is the pair N=50, M=47. If F1 is an active locating frequency of 440 Hz, then the second frequency will be 468.08 Hz. By the method described in U.S. Pat. No. 6,549,011, from a measurement at the receiver of the sum of F1 and F2, separate estimates of phase for each signal can be generated. By multiplying the F1 phase by M and the F2 phase by N, a pair of signals is generated and compared in phase to determine the current direction.

At the common frequency multiple of (in this example) 22 kHz, the phase comparison can be sensitive to jitter, resulting in direction errors in noisy environments. Embodiments according to the present invention can be employed in a similar arrangement, wherein a carrier DPLL locks to the active locating frequency, and a second DPLL locks to the error signal of the first DPLL, which in this case will be a result of the beat frequency between F1 and F2. Alternatively, two DPLLs can be used in a parallel rather than nested arrangement. In all such cases the advantage of using such derivative structures is to compare phases based on NCO signal outputs, which have necessarily very narrow bandwidths and are substantially free of interference, rather than the demodulated carrier signals themselves. (In the example of the method in U.S. Pat. No. 6,549,011, the NCO phases from both DPLLs will be multiplied by the appropriate factor N, M prior to comparison.)

FIG. 11A shows an example of a signal direction calculation according to some current systems. Digital signal 500 is the result of analog conditioning in the receiver front-end, and subsequent digitization. Signal 500 represents the combination of signals with frequencies F1 and F2, with relative phase as defined at a transmitter (not shown). PLLs 501 and 502 independently lock to frequencies F1 and F2, respectively, and can be implemented completely digitally or in part with analog components. The sine and cosine output signals from PLLs 501 and 502 allow the multiplication by complex sinusoids 519, 520, respectively, at each respective frequency F1, F2. Through a phase calculation like the inverse tangent block 212, an estimate of the phase 503, 504 results. As described above, these phases are multiplied by the respective factors M and N in multipliers 505 and 506, respectively, to allow comparison at the common frequency multiple, from which the signal direction 508 can be derived in phase compare block 507.

An embodiment of the present invention, used in a parallel rather than nested arrangement of DPLLs, is shown in FIG. 11B. In this embodiment, the combination of multiplier block 509 with NCO 513 and the combination of multiplier block 510 with NCO 514 may be operationally similar to DPLL 200 as shown in FIG. 2. The DPLL formed by multiplier block 509 and NCO 513 locks to frequency F1 while the DPLL formed by multiplier block 510 with NCO 514 locks to frequency F2, present in the input signal 500. Phase errors 511 and 512 are error input signals to NCOs 513 and 514, similarly to the error input signal e(n) input to NCO 203. Multipliers 509 and 510 may each include an error calculation block such as error block 212 in FIG. 2. As before, the NCO generates an estimate of the phase at that frequency based on the second order solution to EQN. 3 and EQN. 4. The phases are multiplied in multipliers 515 and 516 by the respective factor to allow comparison at the common frequency multiple, as before.

The key difference between the embodiment shown in FIG. 11B and the conventional approach shown in FIG. 11A is that for the system described in FIG. 11A, noise in the input signal will propagate to output phase signals 503 and 504, and directly affect the accuracy of phase comparison 507, independent of the lock parameters of PLLs 501 and 502. The embodiment of the present invention shown in FIG. 11B relies on the fact that the two DPLLs (one formed from the combination of multiplier 509 with NCO 513 and the other formed from the combination of multiplier 510 with NCO 514) will track the phase of the two modulated frequencies F1 and F2. Thus the noise bandwidth (that directly translates to phase comparison accuracy) is governed solely by the DPLL lock parameters, including the bandwidth of the loop arm filters, the $\alpha$ parameter, and the solution $\beta = \alpha^2/4$ of loop equations EQN. 3 and EQN. 4 that are implemented. This allows for a very stable and accurate phase comparison compared to that of the system shown in FIG. 11A, and makes possible the accurate detection of signal direction at lower SINR.

The embodiments described herein are examples only of the invention. Other embodiments of the invention that are within the scope and spirit of this disclosure will be apparent to those skilled in the art from consideration of the specification and practice of the invention disclosed herein. It is intended that the specification and examples be considered as exemplary only and not limiting. The scope of the invention, therefore, is limited only by the following claims.

What is claimed is:

1. A locator receiver, comprising:
at least one processing channel including an electromagnetic field detector, an analog processor coupled to receive signals from the electromagnetic field detector, and a digital processor coupled to receive signals from the analog processor and calculate a signal strength parameter and a modulated signal, wherein the modulated signal is configured to provide data concerning a direction of a signal to distinguish a target conductor,
wherein the digital processor includes an analog-to-digital converter, a digital phase-locked loop coupled to receive the output signal from the analog-to-digital converter and provide the signal strength parameter, and a nested digital phase-locked loop coupled to the phase-locked loop to provide the modulated signal.

2. A locator receiver, comprising:
at least one processing channel including an electromagnetic field detector, an analog processor coupled to receive signals from the electromagnetic field detector, and a digital processor coupled to receive signals from the analog processor and calculate a signal strength parameter and a modulated signal,
wherein the digital processor includes an analog-to-digital converter, a digital phase-locked loop coupled to receive the output signal from the analog-to-digital converter and provide the signal strength parameter, and a nested digital phase-locked loop coupled to the phase-locked loop to provide the modulated signal,
wherein the analog-to-digital converter operates at twice the bandwidth of a highest selectable frequency of an electromagnetic field detected by the electromagnetic field detector.

3. A locator receiver, comprising:
at least one processing channel including an electromagnetic field detector, an analog processor coupled to receive signals from the electromagnetic field detector, and a digital processor coupled to receive signals from the analog processor and calculate a signal strength parameter and a modulated signal; and
a processor coupled to receive the signal strength parameter from each of the at least one processing channel and provide values of characteristics of a conductor based on the signal strength parameter to a display,
wherein the digital processor includes an analog-to-digital converter, a digital phase-locked loop coupled to receive the output signal from the analog-to-digital converter and provide the signal strength parameter, and a nested digital phase-locked loop coupled to the phase-locked loop to provide the modulated signal.

4. The locator of claim 3, wherein values include an electric current in the conductor.

5. The locator of claim 3, wherein values include a depth of the conductor below a surface.

6. The locator of claim 3, wherein values include a location of the conductor.

7. A locator receiver, comprising:
at least one processing channel including an electromagnetic field detector, an analog processor coupled to receive signals from the electromagnetic field detector, and a digital processor coupled to receive signals from the analog processor and calculate a signal strength parameter and a modulated signal,
wherein the digital processor includes an analog-to-digital converter, a digital phase-locked loop coupled to receive the output signal from the analog-to-digital converter and provide the signal strength parameter, and a nested digital phase-locked loop coupled to the phase-locked loop to provide the modulated signal,
wherein the analog-to-digital converter operates at a sample rate of less than twice the bandwidth of a highest selectable locate frequency.

8. The locator of claim 1, wherein the analog processor further includes a programmable gain amplifier.

9. The locator of claim 1, further including a signal direction detector to determine a signal direction.

10. The locator of claim 1, wherein the modulated signal provides communications with a buried object that generates an electromagnetic field detected by the electromagnetic field detector.

11. The locator of claim 10, wherein the buried object is a sonde.

12. The locator of claim 10, wherein the buried object is a marker.

13. The locator of claim 1, wherein the electromagnetic field detector detects electromagnetic fields generated by an elongated conductor coupled to a transmitter.

14. A locator receiver, comprising:
at least one processing channel including an electromagnetic field detector, an analog processor coupled to receive signals from the electromagnetic field detector, and a digital processor coupled to receive signals from the analog processor and calculate a signal strength parameter and a modulated signal,
wherein the digital processor includes an analog-to-digital converter, a digital phase-locked loop coupled to receive the output signal from the analog-to-digital converter and provide the signal strength parameter, and a nested digital phase-locked loop coupled to the phase-locked loop to provide the modulated signal,
wherein the digital phase-locked loop comprises:
a numerically controlled oscillator coupled to receive an error signal and update a carrier frequency, a cosine signal, and an inverted sine signal;
a quadrature arm coupled to receive the inverted sine signal and the output signal from the analog-to-digital converter and generate a quadrature signal;
an in-phase arm coupled to receive the cosine signal and the output signal from the analog-to-digital converter and generate an in-phase signal; and
an error block coupled to receive the quadrature signal and the in-phase signal and calculate the error signal.

15. The locator of claim 14, wherein the in-phase signal is related to the signal strength parameter.

16. The locator of claim 14, wherein the error block executes a transfer function to perform a fixed-point inverse tangent approximation.

17. The locator of claim 14, wherein the quadrature arm includes
a multiplier coupled to receive the inverted sine signal and the output signal from the analog-to-digital converter, the multiplier providing a mixed output signal;
a low-pass filter coupled to filter the mixed output signal and produce a filtered signal; and
an amplifier coupled to amplify the filtered signal.

18. The locator of claim 14, wherein the in-phase arm includes
a multiplier coupled to receive the cosine signal and the output signal from the analog-to-digital converter, the multiplier providing a mixed output signal;
a low-pass filter coupled to filter the mixed output signal and produce a filtered signal; and
an amplifier coupled to amplify the filtered signal.

19. The locator of claim 14, wherein the numerically controlled oscillator calculates the carrier frequency according to the equation $f(n+1)=f(n)+\beta e(n)$, a phase according to the equation $\theta(n+1)=\theta(n)+\alpha e(n)+f(n)$, and the sine and cosine values from the phase.

20. The locator of claim 19, wherein $\beta=\alpha^2/4$.

21. The locator of claim 14, wherein the nested digital phase-locked loop is coupled to receive the inverted sine signal from the numerically controlled oscillator and an unfiltered mixed output signal from a multiplier of the quadrature arm, and wherein the modulated signal is a nested phase signal.

22. The locator of claim 21, wherein the nested digital phase-locked loop includes a FM numerically controlled oscillator coupled to receive an error signal, and the carrier frequency, and provides an inverted sine signal and a cosine signal, the numerically controlled oscillator also generating the modulated signal.

23. The locator of claim 22, wherein the error signal is generated in an error block that receives signals from a quadrature arm and an in-phase arm coupled to the FM numerically controlled oscillator.

24. The locator of claim 22, further including a comparator that receives the modulated signal and keeps the modulated signal at modulo $2\pi$.

25. The locator of claim 24, further including a zero-crossing detector coupled to the comparator to determine when the modulated signal crosses zero to produce a carrier index.

26. The locator of claim 21, further including a filtering and downsampling block coupled to receive the unfiltered mixed output signal from the multiplier of the quadrature arm and produce a signal to the nested phase-locked loop.

27. The locator of claim 25, wherein the carrier index is utilized to sample the carrier signal from the numerically controlled oscillator to produce a sampled signal.

28. The locator of claim 27, wherein a signal direction signal is determined from the sign of the sampled signal.

29. A method of signal processing, comprising:
receiving a signal in a detector;
digitizing the signal to form a digitized signal;
determining a signal strength from an output signal of a digital phased-lock loop coupled to receive the digitized signal; and
determining a modulated signal in a nested digital phased-lock loop coupled to the digital phased-lock loop, wherein the modulated signal is configured to provide data concerning a direction of a signal to distinguish a target conductor.

30. A method of signal processing, comprising:
receiving a signal in a detector;
digitizing the signal to form a digitized signal;
determining a signal strength from an output signal of a digital phased-lock loop coupled to receive the digitized signal; wherein determining the signal strength from the output signal of the digital phase-lock loop comprises:
updating an inverted sine value and a cosine value based on an error signal,
mixing the inverted sine value with the signal in a quadrature arm to form a quadrature signal,
mixing the cosine value with the signal in an in-phase arm to form an in-phase signal, and
determining the error signal from the quadrature signal and the in-phase signal; and
determining a modulated signal in a nested digital phased-lock loop coupled to the digital phased-lock loop.

31. The method of claim 30, wherein the signal strength is determined from the in-phase signal.

32. The method of claim 30, wherein the quadrature arm includes filtering and amplifying to form the quadrature signal.

33. The method of claim 30, wherein the in-phase arm includes filtering and amplifying to form the in-phase signal.

34. The method of claim 30, further including updating a carrier frequency with the sine value and the cosine value.

35. The method of claim 34, wherein determining a modulated signal in a nested digital phase-lock loop coupled to the digital phase-lock loop includes
updating a FM sine value, a FM cosine value, and a carrier index value based on an FM error signal and the carrier frequency, calculating an FM quadrature signal by mixing the FM sine value with a signal received from a multiplier in the quadrature arm of the digital phase-locked loop;

calculating an FM in-phase signal by mixing the FM cosine value with the signal; and calculating the error signal from the FM quadrature signal and the FM in-phase signal.

36. The method of claim 35, wherein the modulated signal is a demodulated FM phase signal and further including determining a signal direction from the demodulated FM phase signal.

37. A line locator, comprising:
means for determining a signal strength;
means for determining a signal direction in a conductor; and
means for distinguishing a target conductor based on the determined signal strength and signal direction.

38. A locator receiver, comprising:
a first digital phase-locked loop with a first numerically controlled oscillator coupled to receive a signal and provide a first phase related to a first frequency; and
a second digital phase-locked loop with a second numerically controlled oscillator coupled to receive the signal and provide a second phase related to a second frequency,
wherein the signal related to the first frequency and the signal related to the second frequency determine a signal direction of a conductor.

39. The receiver of claim 38, wherein a signal direction is determined from a comparison of the first frequency multiplied by a first integer and the second frequency multiplied by a second integer.

40. The receiver of claim 38, wherein the first digital phase-locked loop updates the phase according to the loop equations $\theta(n+1)=\theta(n)+\alpha e(n)+f(n)$ and $f(n+1)=f(n)+\beta e(n)$.

41. The receiver of claim 40, wherein the parameter $\beta$ is $\alpha^2/4$.

42. The receiver of claim 38, wherein the second digital phase-locked loop updates the phase according to the loop equations $\theta(n+1)=\theta(n)+\alpha e(n)+f(n)$ and $f(n+1)=f(n)+\beta e(n)$.

43. The receiver of claim 42, wherein the parameter $\beta$ is $\alpha^2/4$.

44. A method of determining signal direction, comprising:
receiving a digitized signal;
determining a first phase with a first digital phase-locked loop locked to a first frequency;
determining a second phase with a second digital phase-locked loop locked to a second frequency;
determining the signal direction in a conductor from the first frequency and the second frequency.

45. The method of claim 44, wherein determining the first phase includes updating loop equations within a numerically controlled oscillator.

46. The method of claim 44, wherein determining the second phase includes updating loop equations within a numerically controlled oscillator.

47. A locator receiver, comprising:
a first digital phase-locked loop providing signals related to a first frequency of an input signal;
a second digital phase-locked loop providing signals related to a second frequency of the input signal,
wherein the signal related to the first frequency and the signal related to the second frequency determine a signal direction of a conductor.

48. The receiver of claim 47, wherein the first digital phase-locked loop is coupled to receive the input signal and the second digital phase-locked loop is coupled to receive the input signal.

49. The receiver of claim 47, wherein the first digital phase-locked loop is coupled to receive the input signal and the second digital phase-locked loop is coupled to receive a signal from the first digital phase-locked loop.

* * * * *